US012590894B1

(12) United States Patent
Duan et al.

(10) Patent No.: US 12,590,894 B1
(45) Date of Patent: Mar. 31, 2026

(54) SYSTEMS AND METHODS FOR MEASURING TRANSIENT SURFACE REFLECTIVITY OF AN OPTICALLY EXCITED SAMPLE

(71) Applicant: Board of Trustees of the University of Alabama, for and on behalf of The University of Alabama in Huntsville, Huntsville, AL (US)

(72) Inventors: Lingze Duan, Madison, AL (US); Hemang Jani, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 17/307,797

(22) Filed: May 4, 2021

Related U.S. Application Data

(60) Provisional application No. 63/047,864, filed on Jul. 2, 2020.

(51) Int. Cl.
　　*G01N 21/55*　　　(2014.01)
　　*G01N 21/552*　　(2014.01)
(52) U.S. Cl.
　　CPC ..... *G01N 21/552* (2013.01); *G01N 2021/558* (2013.01); *G01N 2021/559* (2013.01)
(58) Field of Classification Search
　　CPC ........... G01N 21/552; G01N 2021/558; G01N 2021/559
　　See application file for complete search history.

(56) References Cited

U.S. PATENT DOCUMENTS

| | | | | |
|---|---|---|---|---|
| 4,710,030 | A | * | 12/1987 | Tauc .................. G01N 21/1702 |
| | | | | 374/57 |
| 5,959,735 | A | * | 9/1999 | Maris ................. G01N 29/2418 |
| | | | | 356/432 |
| 2003/0206292 | A1 | * | 11/2003 | Some ................... G01N 21/636 |
| | | | | 356/237.1 |
| 2006/0231762 | A1 | * | 10/2006 | Ohtake ................ G01N 21/552 |
| | | | | 250/341.8 |
| 2009/0225311 | A1 | * | 9/2009 | Umetsu ................. G01J 3/0218 |
| | | | | 356/317 |
| 2013/0127553 | A1 | * | 5/2013 | Morgner ................... G02F 1/39 |
| | | | | 331/94.1 |
| 2015/0204723 | A1 | * | 7/2015 | Zheng ........................ G01J 4/00 |
| | | | | 356/369 |
| 2015/0378243 | A1 | * | 12/2015 | Kippelen .............. G02F 1/3523 |
| | | | | 359/244 |

* cited by examiner

*Primary Examiner* — Michelle M Iacoletti
*Assistant Examiner* — Mohamed Doumbia
(74) *Attorney, Agent, or Firm* — Butler Snow LLP; Jon E. Holland

(57) ABSTRACT

The present disclosure generally pertains to systems and methods for measuring the surface reflectivity of an excited sample. Such systems may be useful in understanding the transient processes created when materials are energetically excited and how they subsequently evolve. By using various techniques to reduce dispersion and improve signal quality, the disclosed systems are capable of accurately measuring these transient processes across a wide spectral range. In addition, the systems can achieve this accuracy with a far less expensive and complicated setup than would be required for many other optical spectroscopy approaches.

21 Claims, 17 Drawing Sheets

Wavelength (nm)

SYSTEMS AND METHODS FOR MEASURING TRANSIENT SURFACE REFLECTIVITY OF AN OPTICALLY EXCITED SAMPLE

CROSS-REFERENCE TO RELATED APPLICATION

This disclosure claims the benefit of priority to U.S. Provisional Patent Application No. 63/047,864, filed on Jul. 2, 2020, which is incorporated herein by reference in its entirety.

STATEMENT REGARDING FEDERALLY SPONSORED RESEARCH OR DEVELOPMENT

This invention was made with Government support under ECCS-1254902 and ECCS-1606836 awarded by the National Science Foundation (NSF). The Government has certain rights in the invention.

TECHNICAL FIELD

The present disclosure generally relates to predicting energy consumption, and more particularly, methods and systems for measuring surface reflectivity of an excited sample.

RELATED ART

Over the last decade, advances in material science have led to the creation of numerous materials with novel properties, such as two-dimensional (2D) materials, metamaterials, plasmonic materials, and negative-electron-affinity structures. The novel properties of these materials make them potentially useful across a huge range of use cases and technologies. In particular, many of these materials have proven highly useful in various opto-electronic technologies. However, an understanding of several key aspects of these materials remains lacking, limiting their usefulness. Towards this end, technologies enabling a better understanding of their characteristics, structure, and dynamics is important. Particularly important is understanding the transient processes created when the materials are energetically excited. Measuring how these transient processes evolve, such as carrier relaxation and carrier transportation near the surface of a material, is a critical area of concern.

Unfortunately, the timescale and complexity of many of these transient processes makes analyzing them a complex and difficult process. To the extent they exist, techniques approaching the needed temporal and spectral resolution are expensive, difficult to realize, and challenging to operate, and often ill-suited for use on the desired material. And while techniques exist that are (relatively) inexpensive, simple to realize, and easy to operate, these methods lack either the needed temporal resolution or the needed spectral resolution (or both). One such family of techniques that are relatively easy to build and use—but that lack the needed temporal and spectral resolution—is optical transient reflectometry. Optical transient reflectometry attempts to measure transient changes in a material by exciting the material and measuring how the reflectivity of a material changes as it relaxes from its excited state. While improvements have been made, such as with the advent of pump-probe reflectometry (PPR), current methods still lack the needed temporal and spectral resolution to get an accurate measurement of the ultrafast carrier dynamics of the material. Thus, better methods of optical reflective spectroscopy with a broad spectral range and femtosecond-scale temporal resolution are desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for measuring the surface reflectivity of an excited sample. These systems are useful across a wide-range of scientific disciplines and industrial applications, and they may be particularly useful in investigating properties of materials that are important to the field of opto-electronics. More precisely, the systems of the present disclosure may be useful in understanding the transient processes created when materials are energetically excited and how they subsequently evolve. By using various techniques to reduce dispersion and improve signal quality, the disclosed systems are capable of accurately measuring these transient processes across a wide spectral range. In addition, the systems can achieve this accuracy with a far less expensive and complicated setup than would be required for other optical spectroscopy approaches.

Figure 1:
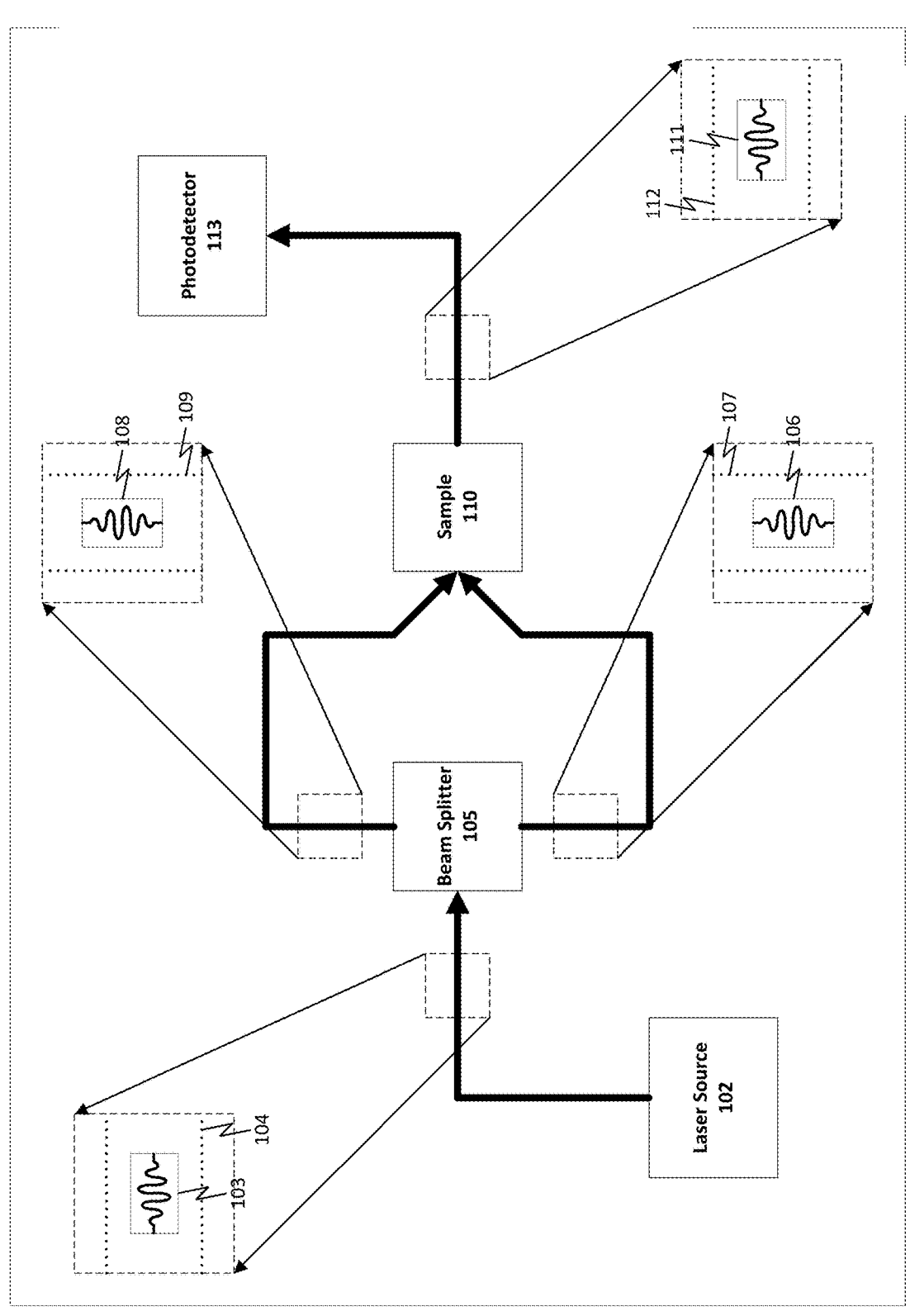
FIG. 1 is a block diagram of a first exemplary embodiment of a pump-probe reflectometry system, according to some embodiments of the present disclosure.

FIG. 1 shows a diagram of a pump-probe reflectometry system 101 in accordance with an exemplary embodiment of the present disclosure. As shown by the figure, a pump-probe reflectometry system 101 is used to measure the surface reflectivity of an excited sample 110. To measure the surface reflectivity, a laser source 102 is used to generate a laser pulse 103. Once generated, the laser pulse 103 is directed along an optical path 104 to a beam splitter 105. As will be described in more detail, dispersion may be intentionally introduced to the pulse along the path 104 in an effort to pre-distort the signal in a manner that compensates for dispersion that will be introduced as the pulse later travels through the system 101 to the sample 110.

The beam splitter 105 acts to split the laser pulse 103 into a pump pulse 106 and a probe pulse 108. Specifically, the beam splitter 105 acts as a partial mirror, transmitting some of the laser pulse 103 on one optical path (such as an optical path 109) and reflecting some of it along another optical path (such as an optical path 107). This allows one of the pulses, the pump pulse 106, to be used to excite the sample 110. The other pulse, the probe pulse 108, can then be used to evaluate the reflectivity of the sample 110. Specifically, the pump pulse 106 is directed along the optical path 107 to the sample 114 and the probe pulse 108 is directed along the optical path 109 to the sample 114. The optical paths are configured so that the optical path 109 is slightly longer than the optical path 107. This causes the probe pulse 108 to arrive after the sample 110 has been excited by the pump pulse 106 but before enough time has passed for the sample 110 to relax from its excited state. The striking of the probe pulse 108 onto the sample 110 generates a probe reflection pulse 111, which can be measured by a photodetector 113. Specifically, the probe reflection pulse 111 is directed along an optical path 112 to the photodetector 113. When the probe reflection pulse 111 reaches the photodetector 113, the photodetector 113 measures the intensity of the probe reflection pulse 111.

Figure 2:
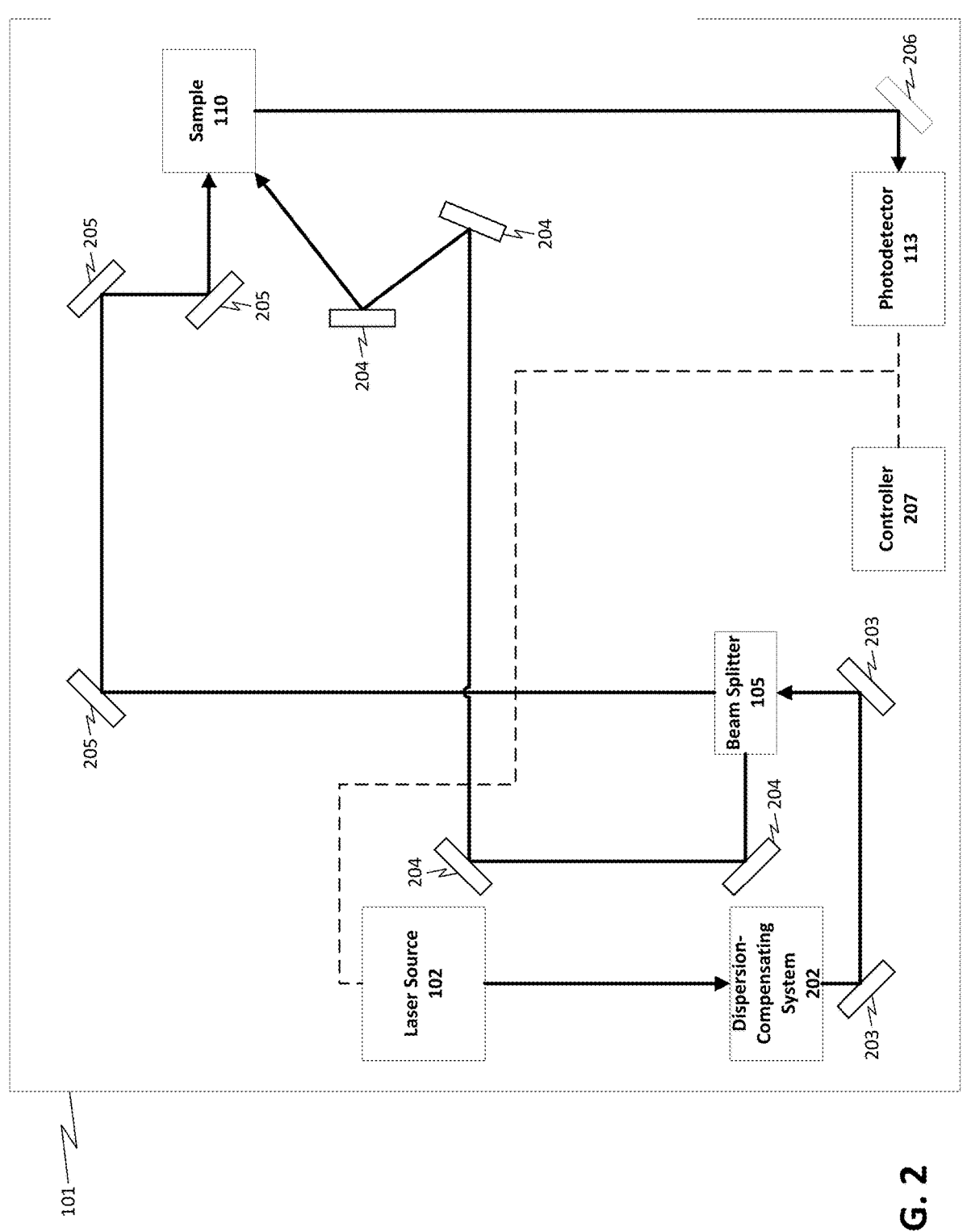
FIG. 2 is a more detailed block diagram of the pump-probe reflectometry system shown in FIG. 1, according to some embodiments of the present disclosure.

FIG. 2 shows a more detailed diagram of the pump-probe reflectometry system 101 of FIG. 1. As shown by the figure, the laser source 102 can be controlled by a controller 207 to generate the laser pulse 103. After being generated, beam-reflecting components 203 can be used to direct the laser pulse 103 along an optical path 104. As shown here, after being generated, the laser pulse 103 is directed along the optical path 104 to a dispersion-compensating system 202. The dispersion-compensating system 202 acts to compensate for the dispersion induced into the laser pulse 103 as the pulse is transmitted along the optical paths between the laser source 102 and the sample 110. It does so by preemptively inducing negative dispersion into the laser pulse 103. Specifically, dispersion-compensating system 202 is configured using measurements of the type and amount of dispersion induced by the optical paths between the laser source 102 and the sample 110. Using these measurements, dispersion-compensating system 202 induces a similar amount of opposite dispersion so that, over the course of the laser pulse 103 being transmitted to the sample 110, the dispersion induced by the dispersion-compensating system 202 compensates for (e.g., substantially cancels) the dispersion induced as it propagates.

After being altered by the dispersion-compensating system 202, the laser pulse 103 is directed to a beam splitter 105 through the optical path 104 by the beam-reflecting components 203. After the pump pulse 106 is generated, beam-reflecting components 204 can be used to direct the pump pulse 106 along the optical path 107 to the sample 110. Similarly, after the probe pulse 108 is generated, beam-reflecting components 205 can be used to direct the probe pulse 108 along the optical path 109 to the sample 110. The beam-reflecting components 205 are configured so that the optical path 109 is slightly longer than the optical path 107, causing the probe pulse 108 to arrive at the sample 110 after the pump pulse 106. After, the probe reflection pulse 111 is generated, beam-guiding components 206 can be used to direct the probe reflection pulse 111 along an optical path 112 by beam-guiding components 206. The photodetector 113 may measure the intensity of the probe reflection pulse 111 and transmit this information to the controller 207. Since the light detected by the photodetector 113 depends on the properties of the probe pulse 108 (which can be known by the controller 207) and the surface reflectivity of the sample 110, the controller 207 may use the information captured by the photodetector 113 to calculate the surface reflectivity of the sample 110.

Measuring the reflectivity of a sample can provide a variety of information about important characteristics of the sample. For example, the variation in the reflectivity of the sample between its relaxed state and its excited state is associated with transient variations in the dielectric constant in the sample, which is in turn strongly influenced by the evolution of the free-carrier population after excitation. This evolution is particularly important in determining the properties (and thus performance characteristics) of the numerous novel materials developed over the last decade, such as two-dimensional (2D) materials, metamaterials, plasmonic materials, and negative-electron-affinity structures. However, the evolution of the free-carrier population, and other important processes, happens very quickly and across a wide spectral band, creating a need for time-resolved broadband spectroscopy with femtosecond-scale temporal resolution.

Existing spectroscopic techniques and the systems that implement them are often unable to adequately meet this demand. Many spectroscopic techniques are simply unable to provide the necessary temporal resolution while also having the broad spectral range needed to enable spectral-domain measurements. And to the extent they exist, spectroscopic techniques that could meet these requirements are either extremely expensive and complicated to realize in a physical system or are unsuitable for studying the desired materials—an issue particularly problematic for studying semiconductor devices. For example, ultrafast luminescence spectroscopy and time-resolve photoelectron spectroscopy, two techniques potentially capable of providing the necessary temporal resolution, are both difficult and expensive to realize experimentally and present additional complications when attempting to analyze semiconductor materials.

Particular relevant are pump-probe reflectometry (PPR), which can be significantly less costly and complicated to experimentally realize than other spectroscopic techniques. Unfortunately, existing PPR systems lack the necessary temporal and spectral resolution. While some progress has been made on increasing the temporal and spectral resolution of these systems, the methods used often only work for one type of resolution and come at the price of trade-offs in the other—in addition to significantly increasing the complexity and cost of the system. More precisely, to the extent prior PPR systems have approached a sufficient temporal resolution, they have done so by trading away a broad spectral width, leaving only a narrow-band of wavelengths unsuitable for spectral-domain measurements. Similarly, to the extent prior PPR systems have approached a sufficient spectral resolution, they have done so by utilizing techniques that compromise the accuracy and resolution of any time-domain measurements, losing the critical ability to evaluate intermediate and transient changes to a sample. Thus, a PPR system capable of femtosecond-scale time resolution with a broad spectral width, particularly one that does not drastically increase the cost or complexity of the basis PPR technique, are greatly desired.

To better address these issues, embodiments of the present disclosure may use a PPR technique similar to the one implemented by the system described in FIG. 2.

Figure 3:
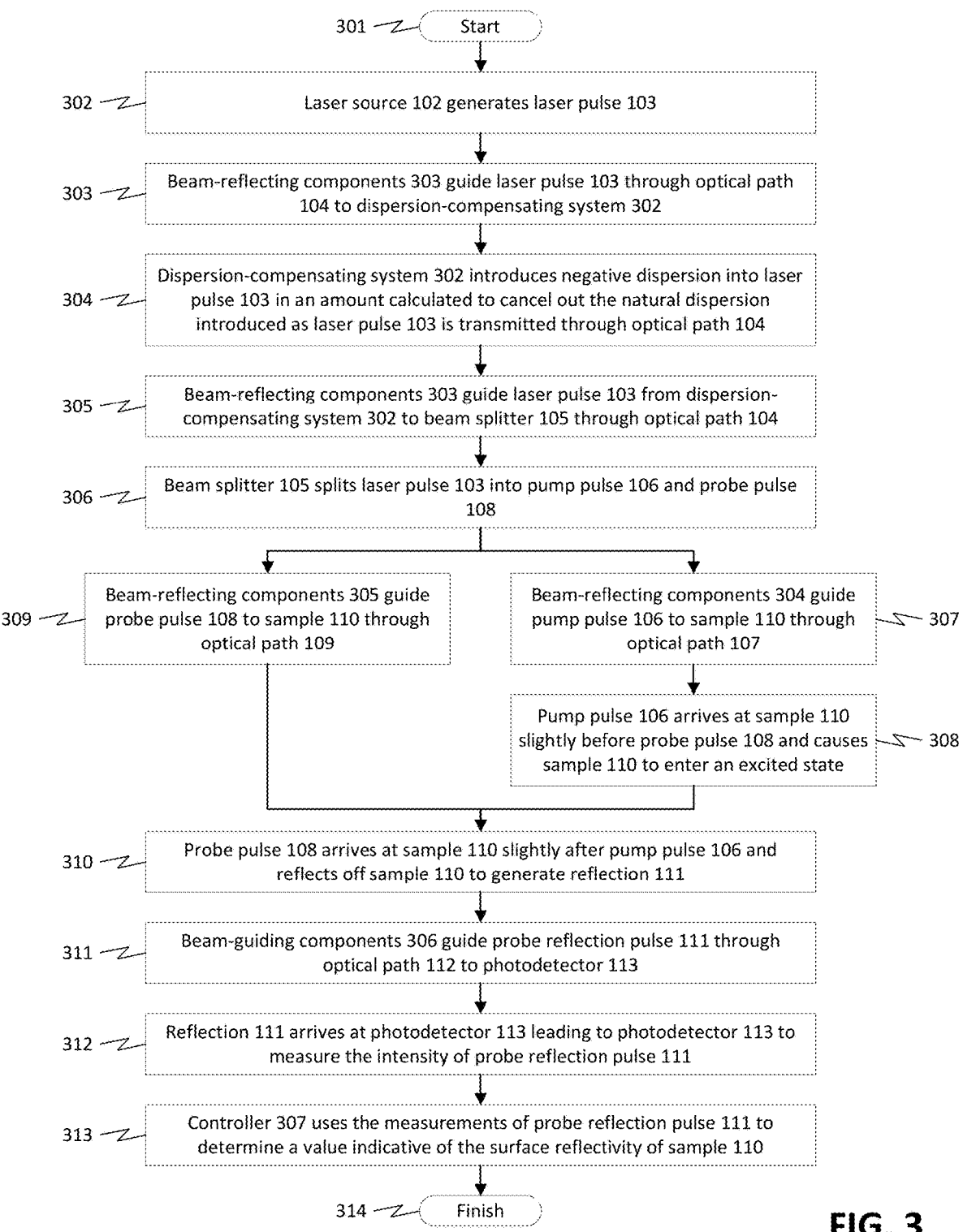
FIG. 3 is a flowchart of an exemplary method of measuring surface reflectivity of a sample, according to some embodiments of the present disclosure.

FIG. 3 is a flowchart illustrating the process of measuring the reflectivity of a sample just described. The process first starts with a laser source 102. As shown by block 302 of FIG. 3, the laser source 102 generates a laser pulse 103. In general, the laser source 102 may be based on a variety of technologies and use a variety of techniques to produce the laser pulse 103. What particular technology the laser source 102 is based on largely depends on what characteristics are desired for the laser pulse 103. These characteristics may include, as an example, the cross-sectional area of the pulse, duration of the pulse, shape of the pulse, and the spectral composition of the pulse. Additionally, the desired ranges for these characteristics may depend significantly on the material (i.e., sample 110, discussed below) being investigated and the precise phenomenon for which the material is being investigated.

Figure 10A:
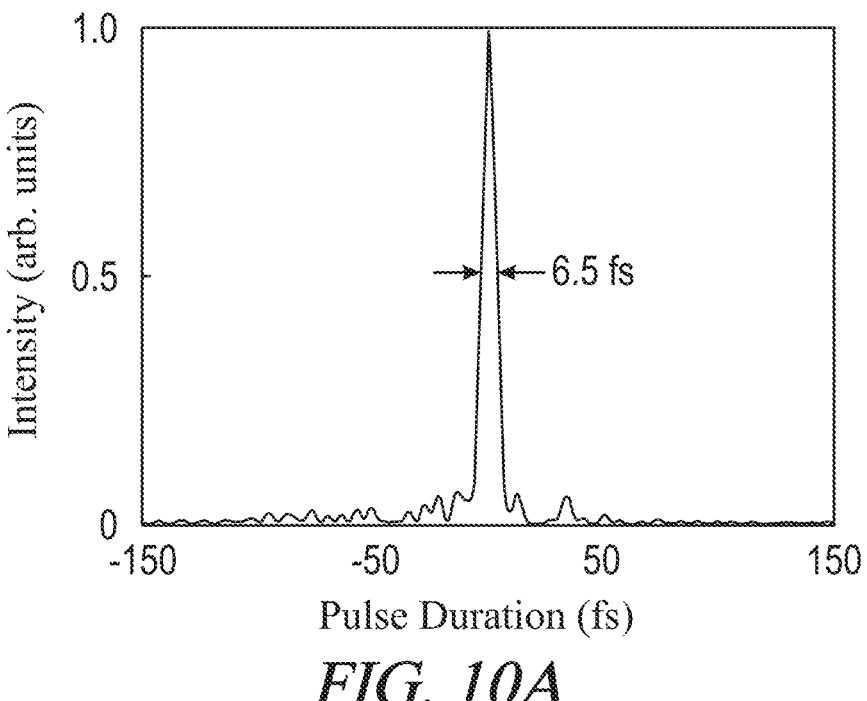
FIGS. 10A-10B are a set of charts illustrating characteristics of a laser pulse, according to some embodiments of the present disclosure.
Figure 10B:
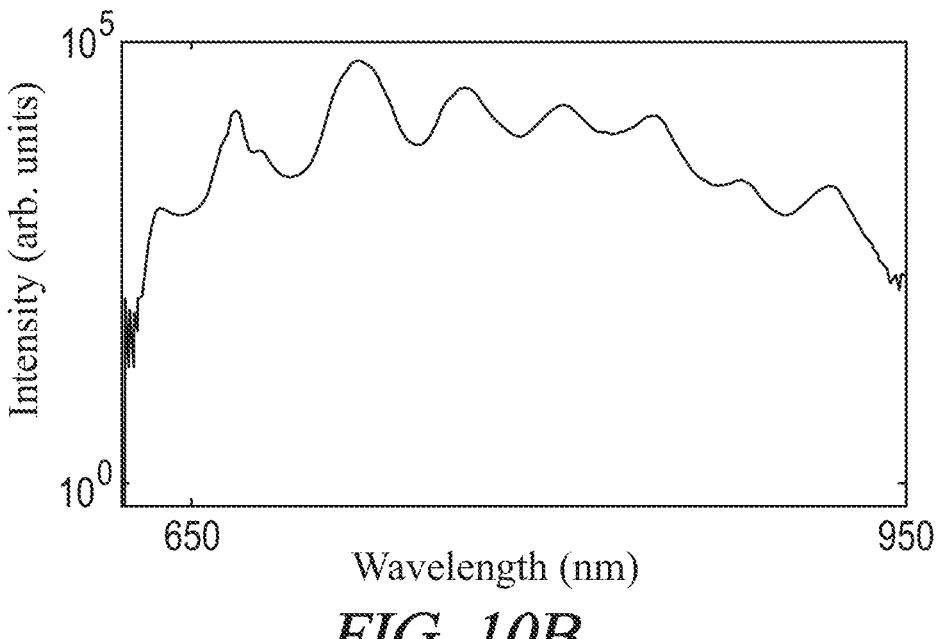
Figure 11A:
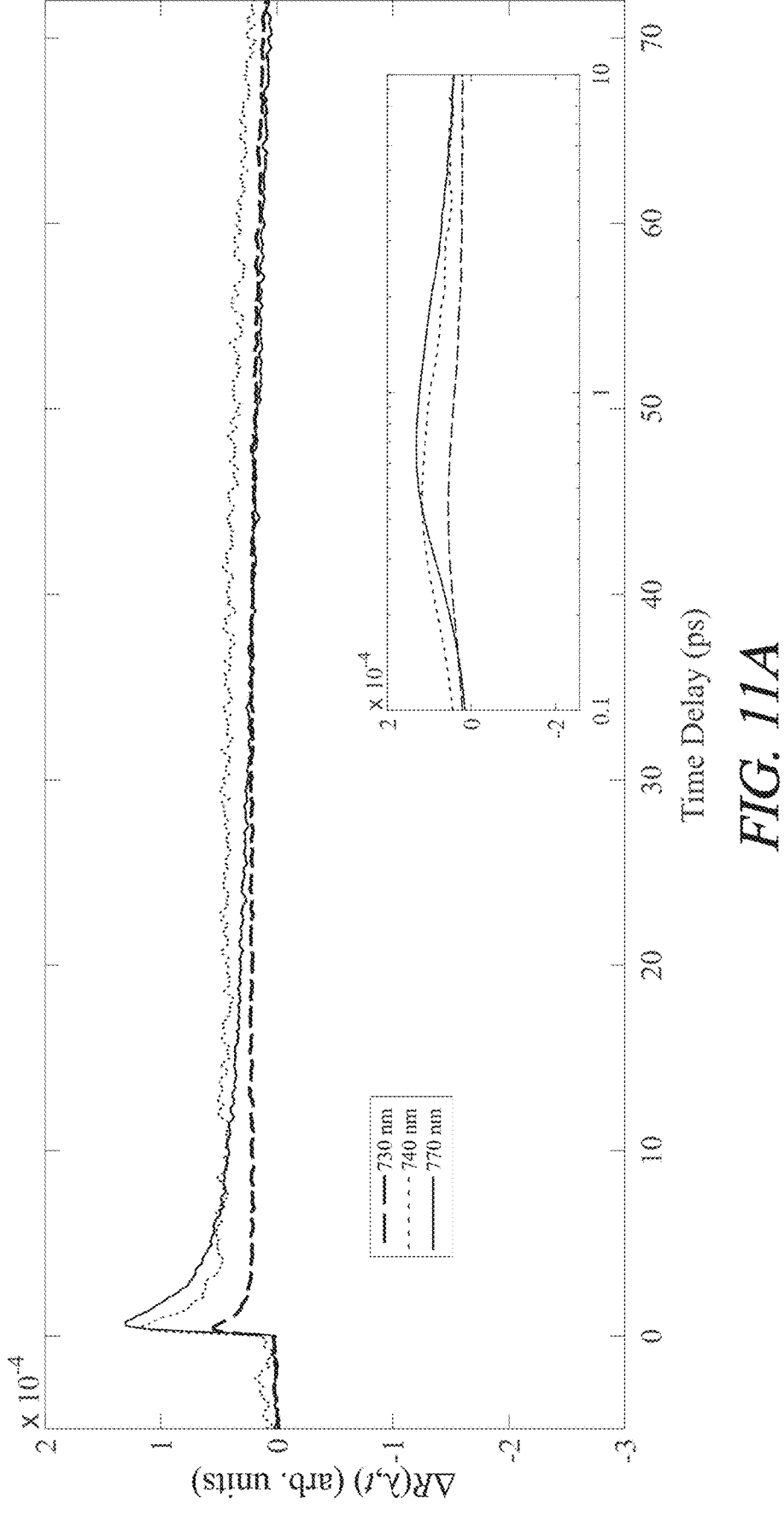
FIGS. 11A-11D are a set of charts illustrating a set of measurements of a reflection from a sample automatically taken at a variety of probe delay times and a variety of spectral ranges, according to some embodiments of the present disclosure.
Figure 11B:
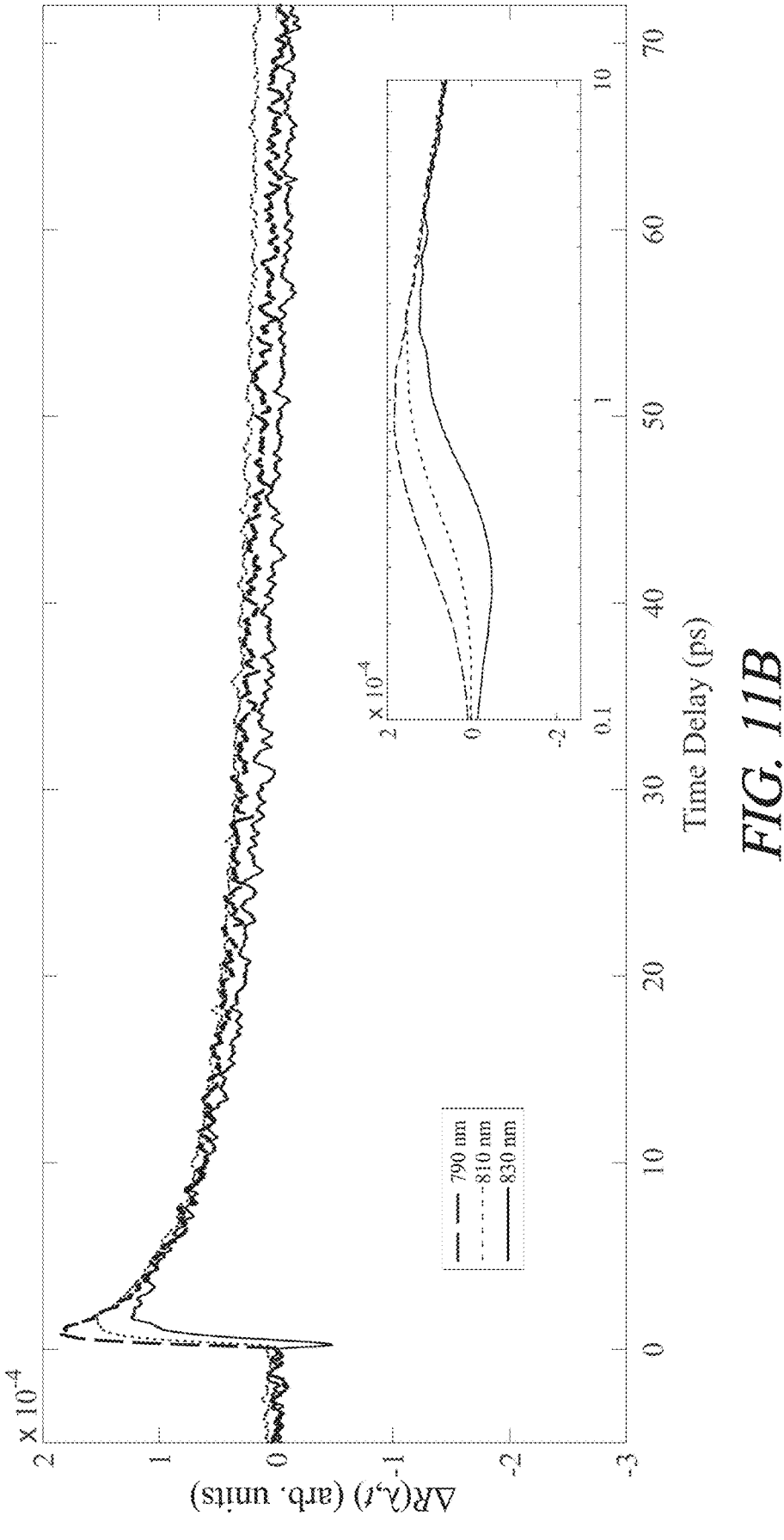
Figure 11C:
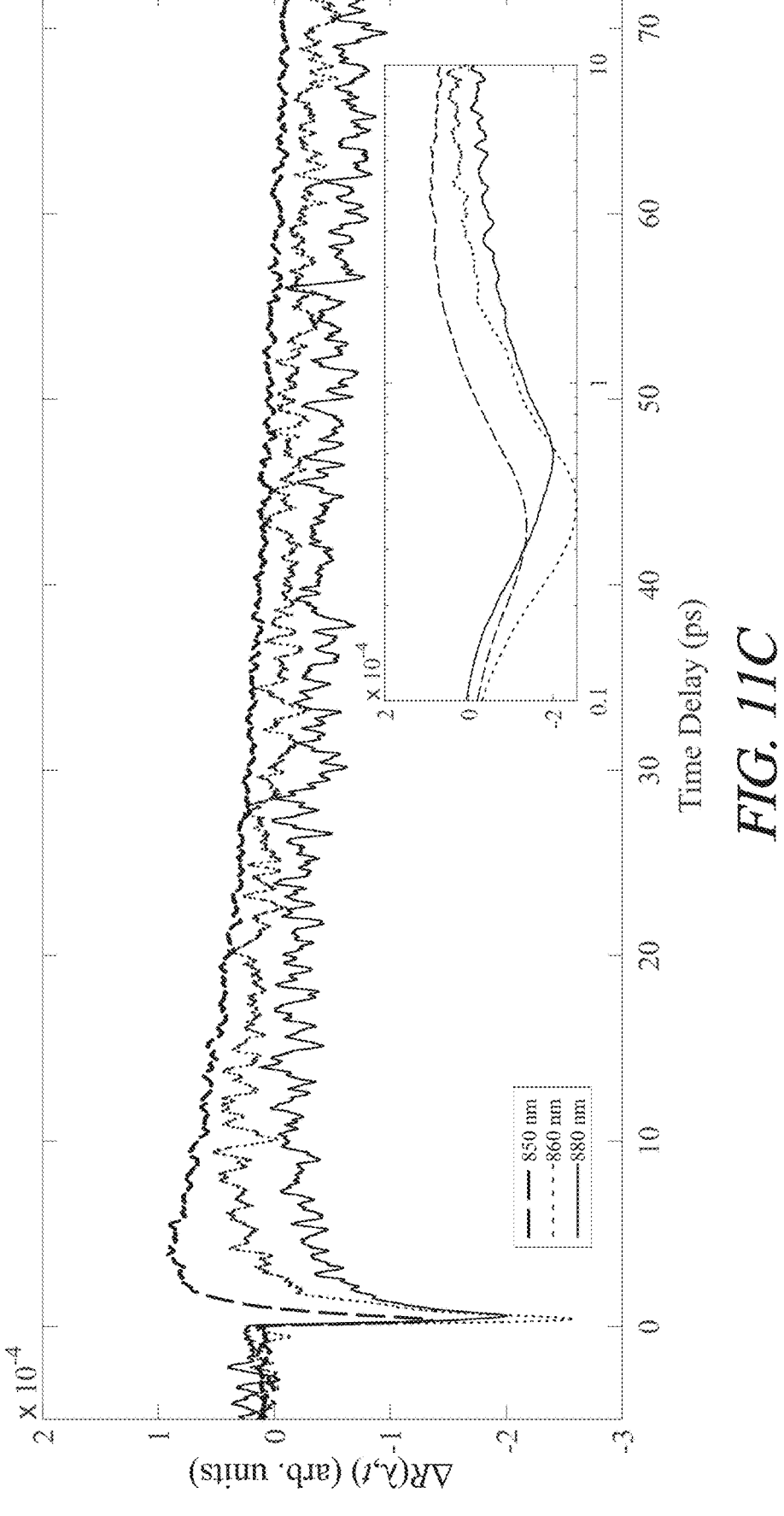
Figure 11D:
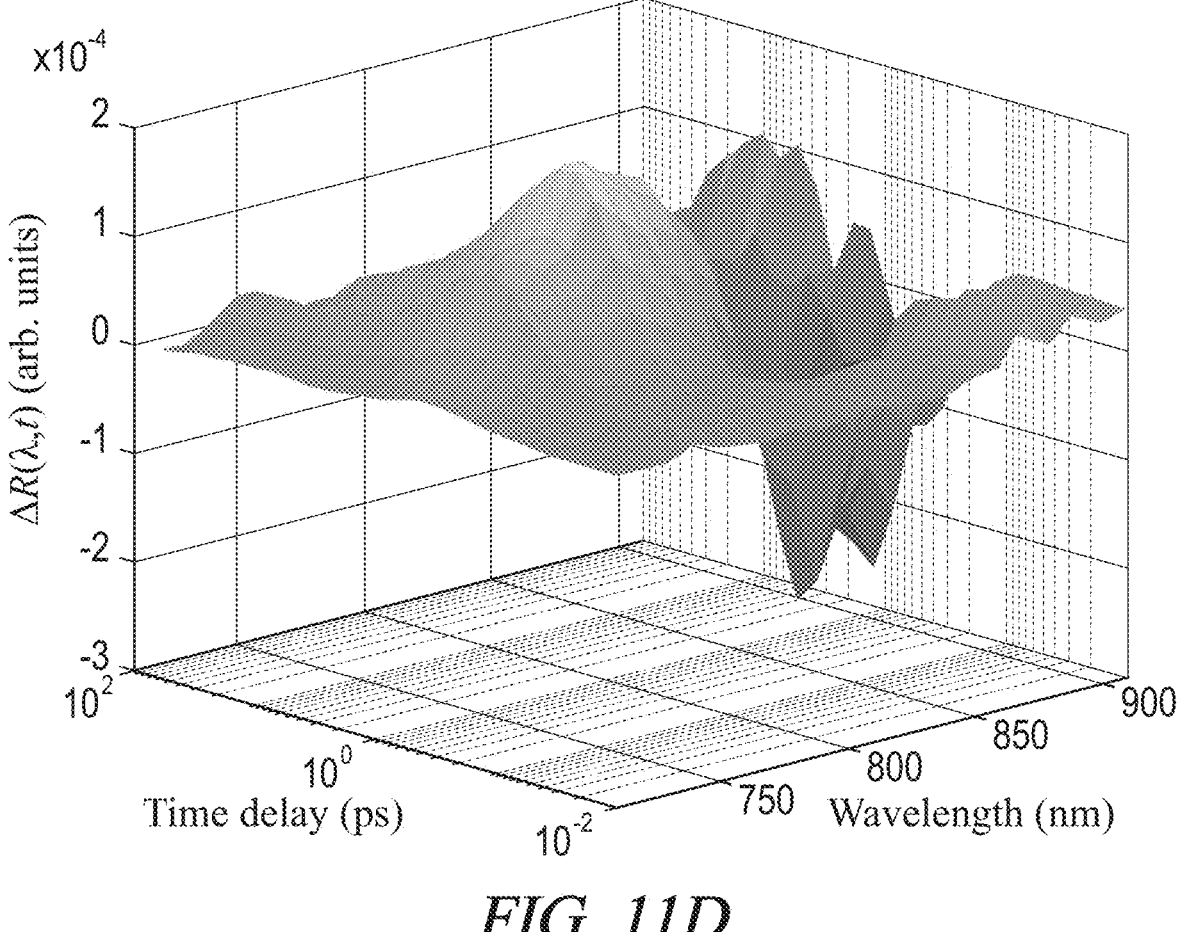

For example, in one embodiment, the laser source 102 is a 6-fs titanium sapphire oscillator having an average power of 500 milliwatts and a repetition rate of 83 megahertz. As shown by FIG. 10A, the laser pulse 103 produced by this laser source 102 has a pulse duration of about 6.5 femtoseconds as measured from when the laser pulse 103's intensity rises above its maximum value to when it decreases below half its maximum value. As shown by FIG. 10B, the spectral range of the laser pulse 103 is from around 650 nm to around 950 nm, giving the pulse a spectral width of around 300 nanometers, as measured from the shortest wavelength having an intensity less than 20 decibels lower than the laser pulse 103's peak intensity to the longest wavelength having an intensity less than 20 decibels lower than the laser pulse 103's peak intensity. In other embodiments, other types of laser sources and pulse characteristics are possible.

After the laser source 102 generates the laser pulse 103, the laser pulse 103 is directed along an optical path 104. As shown by block 303 of FIG. 3, beam-reflecting components 203 direct the laser pulse 103 along the optical path 104 to a dispersion-compensating system 202 (and then to a beam splitter 105). For example, in one embodiment, the beam-reflecting components 203 comprise metallic mirrors (e.g., silver-backed mirrors) that reflect the laser pulse 103 to direct the laser pulse 103 along an optical path 104. In the case of the pump-probe reflectometry system 401 shown in FIG. 4, the beam reflecting components reflect the pulse 103 such that it is directed from the laser source 102 to the dispersion-compensating system 202 and then to the beam splitter 105. Additionally, if the dispersion-compensating system comprises more than one component, one or more beam-reflecting components 203 may be used to direct the laser pulse 103 between these components. For example, in the dispersion-compensating system 202 shown in FIG. 4, a beam-reflecting component 203 is used to direct the laser pulse 103 between a dispersion-compensating mirror 402 and a dispersion-compensating wedge 403, both described in further detail below. Note that using only metallic mirrors in the path 104 (as opposed to dielectric-mirrors or various transparent components that permit light to pass) helps to minimize the amount of dispersion induced into the laser pulse 103 during reflection.

After the laser pulse 103 is transmitted through the optical path 104 and arrives at the dispersion-compensating system 202, the dispersion-compensating system 202 interacts with the laser pulse 103 in order to compensate for dispersion caused by transmission along any optical paths between the laser source 102 and a sample 110 (e.g., optical paths 104, 107, and 109). As shown by block 304 of FIG. 3, the dispersion-compensating system 202 compensates for such dispersion by inducing negative dispersion into the laser pulse 103. More precisely, the dispersion-compensating system 202 induces a substantially similar amount of dispersion as naturally caused by the various optical paths, but with the induced dispersion having a type opposite of the naturally induced dispersion. For example, if the natural environmental dispersion is positive, i.e., causes up-chirping, the dispersion-compensating system 202 induces negative dispersion, i.e., causes down-chirping, and vice-versa if the environmental dispersion is negative. Note that the magnitude of dispersion induced by the system 202 is ideally the same as the magnitude of dispersion induced by the optical paths after the system 202 so that such dispersions completely cancel. However, in a practical system, it can be difficult to arrange the system 202 such that these dispersions precisely match. The term "substantially similar" recognizes that matching does not have to be precise, and generally the closer that the dispersions match, the better is the resulting signal quality. An amount of dispersion induced by the system 202 within 10 percent or less of the magnitude of the naturally induced dispersion shall be considered to be "substantially similar."

To provide a better understanding of how the dispersion-compensating system 202 preemptively accounts for the environmental dispersion caused by transmission along (and interaction with the materials present in) various optical paths (e.g., optical paths 104, 107, and 109), a brief description of dispersion is helpful. To start, note that a signal, such as a laser pulse, is simply a series of waves propagating through space. The properties of these waves—e.g., their frequencies, wavelengths, amplitudes and relative phases—may be different. Additionally, the shape or group that follows the outer contours of these waves (and thus contains them) is known as the signal's wave envelope. Also note that the signal can be thought of as being (and in some sense physically is) a linear combination of component waves, each with their own frequency, wavelength, amplitude and phase.

Group velocity dispersion then refers to a situation when the speed at which a wave travels through a medium depends on the frequency of that wave. For example, when group velocity is positive, waves with higher frequencies (and hence shorter wavelengths) travel more slowly than waves with lower frequencies (and hence longer wavelengths). Since a signal is a combination of higher and lower frequencies (and hence shorter and longer wavelengths), this results in the signal spreading over a broader time range (and thus across a broader spatial range), with the lower-frequency and longer-wavelength components at the front of the signal. This phenomenon is known as up-chirping because it results in a signal that increases in frequency from front to back, i.e., the signal begins with a lower frequency and ends with a higher frequency. When group velocity is negative, the opposite occurs. Higher frequencies and shorter wavelengths travel more quickly than lower frequencies and longer wavelengths. This still results in spreading of the signal, except this time with the higher frequencies and shorter wavelengths in front. This phenomenon is known as down-chirping since it causes the leading edge of a signal to start with a higher frequency that transitions to a lower frequency on its trailing edge. The amount of dispersion a material causes in a signal typically depends on the length the signal travels through that material.

Group velocity dispersion is problematic for two reasons. First, the ability to measure short-lasting changes on a material's reflectivity depends on the pulse interacting with the material only when the transient change is in effect. Otherwise, any difference in the light reflected while the change is in effect is averaged with the reflection of light when the change is not in effect, obscuring the change in a large amount of noise. Second, the spreading of the frequency spectrum leads to only some wavelengths of light interacting with the material when the transient change is in effect, with other wavelengths reflecting when it is not in effect. This makes it difficult to determine the change in reflectivity for particular wavelengths. Ideally, for the laser pulse 103, the pulse width is narrow—i.e., has a short duration and is spatially concentrated. The laser pulse 103 ideally also has a uniform spectral composition throughout the pulse (i.e., has the same "color" throughout the pulse). Group-velocity dispersion disrupts both of these properties, causes the laser pulse 103 to become broader and to have a non-uniform spectral composition.

The dispersion-compensating system 202 is designed to avoid these issues. More precisely, the dispersion-compensating system 202 takes advantage of the fact that a narrow pulse-width and uniform spectral composition are needed only once the laser pulse 103 reaches the sample 110. To start, the natural dispersion caused during transmission along various optical paths between the laser source 102 and the sample 110 can be measured. These measurements can be used to configure the dispersion-compensating system 103 so that it causes an amount of dispersion of the opposite type but with the same cumulative magnitude. This results in broadening of the width of the laser pulse 103 and separation of the pulse's spectral composition. As the laser pulse 103 travels along various optical paths towards the sample 110, however, the natural environmental dispersion will gradually cancel the dispersion induced by the dispersion-compensating system 202. This results in the pulse-width gradually narrowing and its spectral composition gradually re-combining. Done correctly, at its arrival at the sample 110, the pulse-width has narrowed back to nearly (and ideally, exactly) its original duration and its spectral combination has nearly (and ideally, exactly) recombined into its original uniform composition.

The specific means by which the dispersion-compensating system 202 induces dispersion into the laser pulse 103 may vary, particularly with regards to the spectral range of the laser pulse 103. In some cases, dispersion-compensating system 202 may use multiple internal components to induce dispersion into the laser pulse 103.

Figure 4:
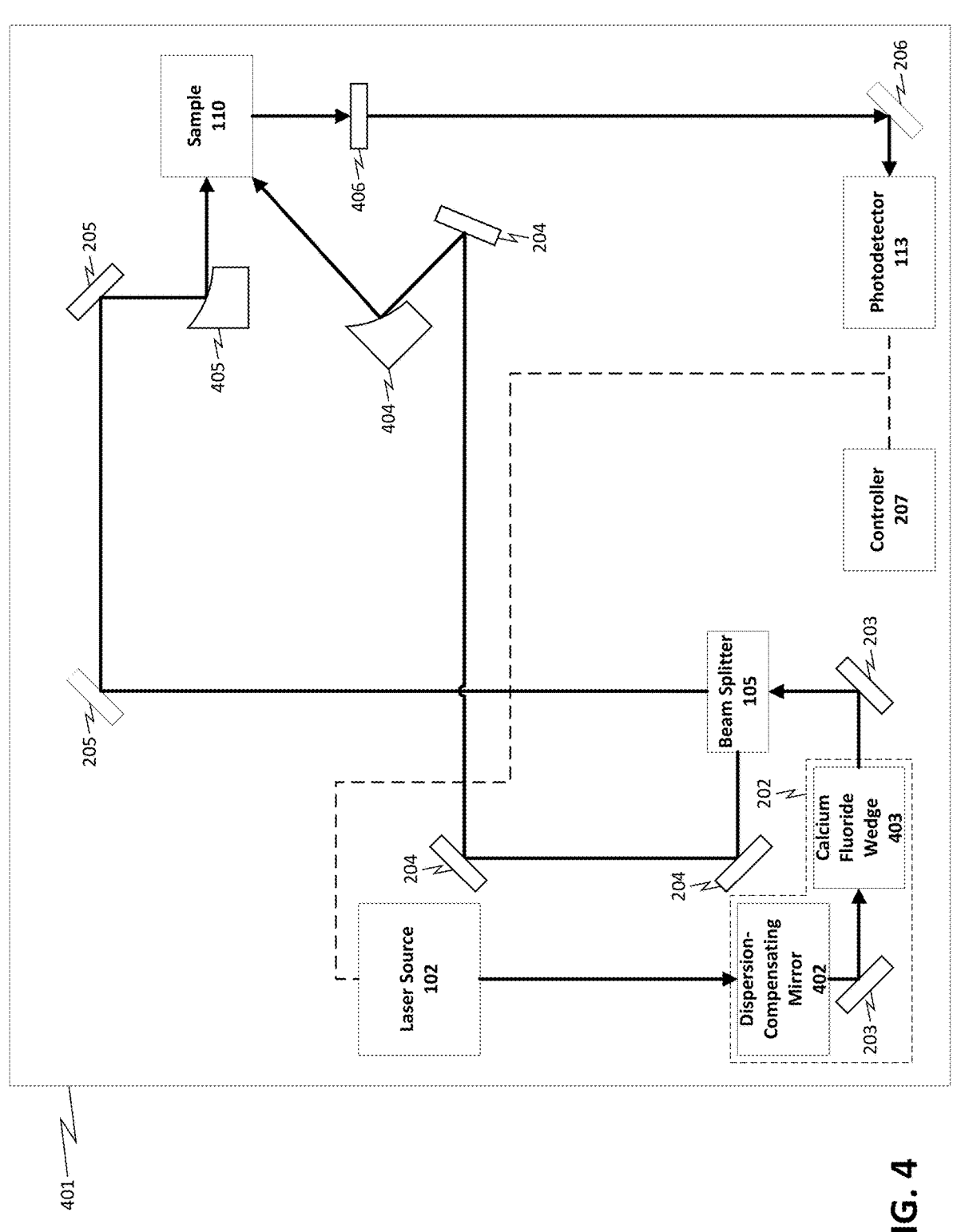
FIG. 4 is a block diagram of a second exemplary embodiment of a pump-probe reflectometry system, according to some embodiments of the present disclosure.

For example, in the embodiment shown in FIG. 4, the dispersion-compensating system 202 comprises a dispersion-compensating mirror 402 and a dispersion-compensating wedge 403. The dispersion-compensating wedge 403 can be composed of a variety of materials, with the material chosen significantly depending on the spectral composition of the laser pulse 103 and the dispersion being corrected. For example, for a laser pulse 103 with a spectral range from around 650 nm to around 900 nm, calcium fluoride ($CaF_2$) is a useful material to utilize to make the dispersion-compensating wedge 403, but other materials may be used in other embodiments. The dispersion-compensating mirror 402 is positioned within the optical path 104 and is used to add negative dispersion into the laser pulse 103 that is approximately equivalent to the natural environmental dispersion. The dispersion-compensating wedge 403 is positioned within the optical path 104 after the dispersion-compensating mirror 402 and is used to fine-tune the dispersion induced into laser pulse to more closely align to (and ideally equal) the natural environmental dispersion. In other words, the dispersion-compensating mirror 402 handles course-grained dispersion compensation while the dispersion-compensating wedge 403 handles fine-grained dispersion compensation. A benefit of this setup is that it is easier to use the dispersion-compensating wedge 403 to make subtle adjustments compared to using the dispersion-compensating mirror 402 alone. In other embodiments, other types of mirrors and wedges may be similarly used.

After being altered by the dispersion-compensating system 202, the laser pulse 103 is directed along the optical path 104 by beam-reflecting components 203 to the beam splitter 105, as shown by block 305 of FIG. 3.

After the laser pulse 103 is transmitted through the optical path 104 and arrives at the beam splitter 105, the beam splitter 105 interacts with the laser pulse 103 to split the laser pulse 103 into separate pulses. Specifically, as shown by block 306 of FIG. 3, the beam splitter 105 splits the laser pulse 103 into a pump pulse 106 and a probe pulse 108 by reflecting part of the laser pulse 103 and permitting the remainder of the laser pulse 103 to pass. In some embodiments, the beam splitter 105 is a dispersion-balanced beam splitter such that the beam splitter 105 induces a similar amount of dispersion into both pulses 106 and 108, as will be described in more detail below, but other types of beam splitter are possible. In the pump-probe reflectometry system shown in FIG. 4, the reflected light is used as the pump pulse 106, and the light passing through the beam splitter 105 is used as the probe pulse 108. However, it is possible for system to be arranged in other embodiments such that the pump pulse 106 passes through the beam splitter and the probe pulse 108 reflects from the beam splitter.

The laser pulse is split into two pulses, the pump pulse 106 and the probe pulse 108, so that one pulse can be used to excite the sample 110 and one pulse can be used to measure the reflectivity of the excited sample. Splitting laser pulse 103 rather than, for example, generating the pump pulse 106 with one laser source and generating the probe pulse 108 with a separate laser source, has several advantages. As an example, splitting the laser pulse 103 avoids the need for a second laser source, thereby reducing the complexity and costs of the system. For example, it avoids the need to carefully calibrate the two laser sources so that the characteristics of the produced pulses are the same. It also avoids the difficult task of calibrating the two laser sources so that the production of the pulses is coordinated in time within an extremely precise margin. For a temporal-resolution of several femtoseconds, this margin would likely need to be less than a femtosecond. In comparison, generating the two pulses by splitting a single laser pulse automatically results in the coordinated production of the pump pulse 106 and the probe pulse 108 since both pulses are simultaneously emitted by the splitter 105. In addition, the timing of the arrivals of the two pulses at the sample can be precisely controlled by the respective path lengths traversed by the pulses.

Another advantage of generating the pump pulse 106 and the probe pulse 108 by splitting the laser pulse 103 is that the same dispersion-compensating system 202 be used to counteract the dispersion of both the pump pulse 106 and the probe pulse 108 prior to the split. So long as the optical paths taken by the pump pulse 106 and the probe pulse 108, i.e., the optical paths 107 and 109, have a substantially similar level of dispersion, the dispersion-compensating system 202 can be configured to counteract this dispersion for both pulses. In the pump-probe reflectometry systems 101 and 401 shown in FIGS. 2 and 4, the beam-reflecting components 204 and 205 can be designed to induce minimal dispersion and the lengths of the optical paths 204 and 205 can be controlled to be close to (but not exactly) the same length so that each pulse experiences a similar amount of small dispersion. In addition, as indicated above, the beam splitter 105 can be designed to induce a similar amount of dispersion into both the pulses 106 and 108. Keeping dispersion low and symmetrical with respect to the two pulses 106 and 108, the dispersion-compensating system 202 is able to more effectively compensate for dispersion, and since the system 202 operates on the pulse 103 prior to the splitter 105, the compensation effect of the system 202 on both pulses 106 and 108 should be balanced.

As indicated above, the beam splitter 105 is preferably dispersion-balanced so that the beam splitter induces a similar amount of dispersion into both pulses 106 and 108. A dispersion-balanced beam splitter is typically designed to induce more dispersion into the reflected light than other types of beam splitters, since the light passing through a typical beam splitter, without deliberate intervention, experiences more dispersion than the reflected light.

Also note that the beam splitter 105 may be configured to reflect more light than it allows to pass, and vice-versa. In other words, the intensity of the laser pulse 103 may be divided unequally between the pump pulse 106 and the probe pulse 108. The percentage of this division may depend on various design factors, including the combination of the strength of the laser pulse 103, the energy needed to sufficiently excite the sample 110, and the precision desired for the measurement of the reflectivity of the sample 110. For example, in one embodiment, the optical power of the laser pulse 103 is divided between the pump pulse 106 and the probe pulse 108 at a 10:1 ratio, so that the pump pulse 106 has around 90% of the incoming optical power and the probe pulse 108 has around 10% of the incoming optical power. This ratio, for a 500-milliwatt laser and a pulse width of around 6.5 femtoseconds, is particularly appropriate for probing the evolution of ultrafast carrier dynamics in gallium arsenide (GaAs). However, other power ratios and other types of lasers and pulse widths are possible in other embodiments.

After the laser pulse 103 has been split by the beam splitter 105 into the pump pulse 106 and the probe pulse 108, various beam-reflecting components 204, as shown by block 307 of FIG. 3, direct the pump pulse 106 through an optical path 107 towards the sample 110. For example, in one embodiment, the beam-reflecting components 204 comprise metallic mirrors (e.g., silver-backed mirrors) that reflect the pump pulse 106 to direct it along the optical path 107. In the case of the pump-probe reflectometry system 401 shown in FIG. 4, the beam-reflecting components 204 reflect the pump pulse 106 such that it is directed from the beam splitter 105 to the sample 110. Additionally, as shown by FIG. 4, the beam-reflecting components 204 also include an off-axis parabolic mirror 404 positioned within the optical path 107 between the beam splitter 105 and the sample 110. The off-axis parabolic mirror 404 is configured to focus the pump pulse 106 onto an area of the sample 110 referred to as the pump region. Note that using only metallic mirrors (as opposed to dielectric-mirrors or various beam-guiding components that rely on passing through transparent materials to direct light) helps to minimize the amount of dispersion induced into the pump pulse 106 during reflection.

Eventually, as shown by block 308 of FIG. 3, the pump pulse 106 arrives at and strikes the sample 110 causing it to become (energetically) excited. In other words, the pump pulse 106 interacts with sample 110 so as to transfer its energy to the atoms on the surface of sample 110 within the pump region. By design, the probe pulse 106 arrives at the sample 110 a certain amount of time (referred to as the probe time delay) before the probe pulse also arrives at the sample 110. This is achieved by precisely controlling the lengths of the optical paths 106 and 109 such that the optical path 109 is longer than the optical path 106 by a certain amount (referred to as the pulse probe distance offset). Since both the pump pulse 106 and the probe pulse 108 travel at the same speed, changing the pulse probe distance offset directly controls the probe time delay. This allows the pump-probe reflectometry system 101 to be configured to measure the reflectivity of the sample 110 at a specific time after the sample 110 is excited, such as, for example, 10 or 50 femtoseconds depending on the test being performed. This may be used to, for example, determine the evolution of the sample's reflectivity as it transitions from its excited state back to its ground state. In turn, the evolution of the sample's reflectivity may be used to determine the evolution and dynamics of various transient processes occurring in the sample 110.

Simultaneously with the probe pulse 106 being directed towards the sample 110, various beam-reflecting components 205, as shown by block 309 of FIG. 3, direct the probe pulse 108 thorough an optical path 109 towards the sample 110. For example, in one embodiment, the beam-reflecting components 205 comprise metallic mirrors (e.g., silver-backed mirrors) that reflect the probe pulse 108 to direct the probe pulse 108 along an optical path 109. In the case of the pump-probe reflectometry system 401 shown in FIG. 4, the beam-reflecting components 205 reflect the probe pulse 108 such that it is directed from the beam splitter 105 to the sample 110. Additionally, as shown by FIG. 4, the beam-reflecting components 205 also include an off-axis parabolic mirror 405 positioned within the optical path 109 between the beam splitter 105 and the sample 110. The off-axis parabolic mirror 405 is configured to focus the probe pulse 108 onto an area of the sample 110 referred to as the probe region. The probe region that the probe pulse 108 is focused onto is within the pump region the pump pulse 106 is focused onto. Typically, the probe region is smaller than and centered on the pump region 106 to ensure that the data obtained from the probe pulse 108 is from only excited portions of the sample 110. Note that using only metallic mirrors (as opposed to dielectric-mirrors or various beam-guiding components that rely on passing through transparent materials to direct light) helps to minimize the amount of dispersion induced into the probe pulse 108 during reflection.

Eventually, as shown by block 310 of FIG. 3, the probe pulse 108 arrives at and strikes the sample 110 the probe region of the sample 110. Some portion of the probe pulse 108 reflects off the probe region of the sample 110, thereby providing a probe reflection pulse 111. In other words, the probe pulse 108 interacts with the sample 110 (particularly the atoms at or near the surface of the sample 110) resulting in some of the light of the probe pulse 108 being reflected in the form of probe reflection pulse 111 with most of the remainder being scattered or absorbed.

After the probe pulse 108 reflects off the sample 110 and generates the probe reflection pulse 111, the probe reflection pulse 111 is directed along an optical path 112. As shown by block 311 of FIG. 3, beam-guiding components 206 direct the probe reflection pulse 111 along the optical path 112 to a photodetector 113. For example, in one embodiment, the beam-guiding components 206 comprise various optical components used to direct or otherwise guide the probe reflection pulse 111 such that it is directed from the sample 110 to the photodetector 113.

Additionally, as shown by FIG. 4, the beam-guiding components 206 also include a lens 406 positioned within the optical path 112 between the sample 110 and the photodetector 113. The lens 406 is configured to focus the probe reflection pulse 111 onto the photodetector 113. Note that, as shown by the lens 406, beam-guiding components 206 do not necessarily use only metallic mirrors to direct the probe reflection pulse 111 as is the case with beam-reflecting components 203, 204, and 205 in some embodiments. In other words, the beam-guiding components 206 may comprise components that direct or otherwise guide the probe reflection pulse 111 through mechanisms other than reflection by a metallic mirror, e.g., via reflection by a dielectric mirror or via passage through transparent materials. A reason that the beam-guiding components 206 might comprise mechanisms other than metallic mirrors even when special care is taken to ensure that the beam-reflecting components 203, 204, and 205 comprise only metallic mirrors is that, once the probe pulse 108 interacts with the sample and generates the probe reflection pulse 111, the pulse width or temporal shape of the probe reflection pulse may be less of a critical factor in the measurement. In particular, the pulse width or temporal shape of the probe reflection pulse may have less of an impact when the photodetector 113 measures the radiant energy of the probe pulse 108, since a measurement of the radiant energy of the probe reflection pulse 111 is largely independent of dispersion. Therefore, dispersion experienced by the probe reflection pulse 111 has significantly less effect on the accuracy of the measurements made by pump-probe reflectometry system 401 than the dispersion experienced by the laser pulse 103, the pump pulse 106, or the probe pulse 108.

After the probe reflection pulse 111 is transmitted though the optical path 112 and arrives at the photodetector 113, the photodetector 113 interacts with the probe reflection pulse 111 to measure the probe reflection pulse 111. As shown by block 312 of FIG. 3, the photodetector 113 measures the probe reflection pulse 111 by determining the intensity of the light comprising the probe reflection pulse 111. More specifically, the photodetector 113 ascertains the amount of light comprising probe reflection pulse 111, thereby indicating how much of the probe pulse 108 was reflected. In this regard, the photodetector 113 may measure the radiant energy of the probe reflection pulse 111, i.e., the total energy of the light comprising the probe reflection pulse 111, which may be measured in units of joules. The photodetector 113 may directly determine this value or it may determine another related value, such as the radiant flux of the probe reflection pulse 111, which can be used to determine the radiant energy of the probe reflection pulse 111. The photodetector 113 could potentially evaluate other properties of the probe reflection pulse 111 in other embodiments.

In terms of mechanics, the photodetector 113 can employ a variety of technologies that use various techniques to measure light. Typically, these techniques use some form a photoelectric circuit that can convert incoming light into a current, with the current produced having some defined relationship with the incoming ambient light. However, in measuring the intensity of the probe reflection pulse 111, it may be desirable for the photodetector 113 to have a certain sensitivity and signal-to-noise ratio across the probe pulse's spectral range. In many cases, the differences in the reflectivity of the sample 110 that are attempting to be measured are minute, such that a high level of precision is desirable. In one embodiment, the photodetector 113 is a silicon photodetector, but other types of photodetectors are possible.

After the photodetector 113 as shown by block 313 of FIG. 3, the controller 207 uses the measurements of the probe reflection pulse 111 obtained by the photodetector 113 to determine a value indicative of the surface reflectivity of the sample 110. For example, the controller 207 may be electrically connected to the photodetector 113 and may retrieve from the photodetector a value indicating the radiant energy of the probe reflection pulse 111. The controller 207 may combine this with information about the radiant energy of the probe pulse 108 to determine what amount (e.g., percentage) of the probe pulse was reflected by the sample 110. The controller 207 can then use the value indicating such amount to determine the surface reflectivity of the sample 110.

With regards to information about the radiant energy of the probe pulse 108, the controller 207 may be pre-programmed with this information. For example, since the radiant energy and reflect-to-transmit ratio of the beam splitter 105 are both pre-set, this information can be used to obtain the value of the radiant energy of the probe pulse 108, and the controller 207 may then be pre-configured with this information. Alternatively, the controller 207 may obtain real-time information about the radiant energy of the probe pulse 108. For example, a portion of the probe pulse 108 may be split by a beam splitter (not shown) and sent to a spectrometer (not shown) for real-time measurement of the radiant energy and spectral composition of the probe pulse 108. The controller 207 may obtain this information from the spectrometer and use it to determine the radiant energy of the portion of the probe pulse interacting with the sample 110.

The controller 207 may be implemented in hardware, software, or a combination of hardware and software. As an example, the controller 207 may comprise one or more field programmable gate arrays (FPGAs) or one or more application-specific integrated circuits (ASICs). In some embodiments, the controller 207 may comprise one or more processors (e.g., central processing units (CPUs) or microprocessors) programmed with software that when executed by the processor cause the processor to perform the functions described herein for the controller 207. In other embodiments, other configurations of the controller 207 are possible.

Note that, in a typical open-air setup, the optical paths of the pump-probe reflectometry system 101 (e.g., the optical paths 104, 107, 109, and 112) may contain gases, such as nitrogen and oxygen at standard temperature and pressure (i.e., the earth's atmosphere at sea level), along with optical components positioned within these paths. In other embodiments, the system 101 may be located in a chamber for which the environmental conditions (including gases, temperature, and pressure) are controlled as may be desired.

Figure 5:
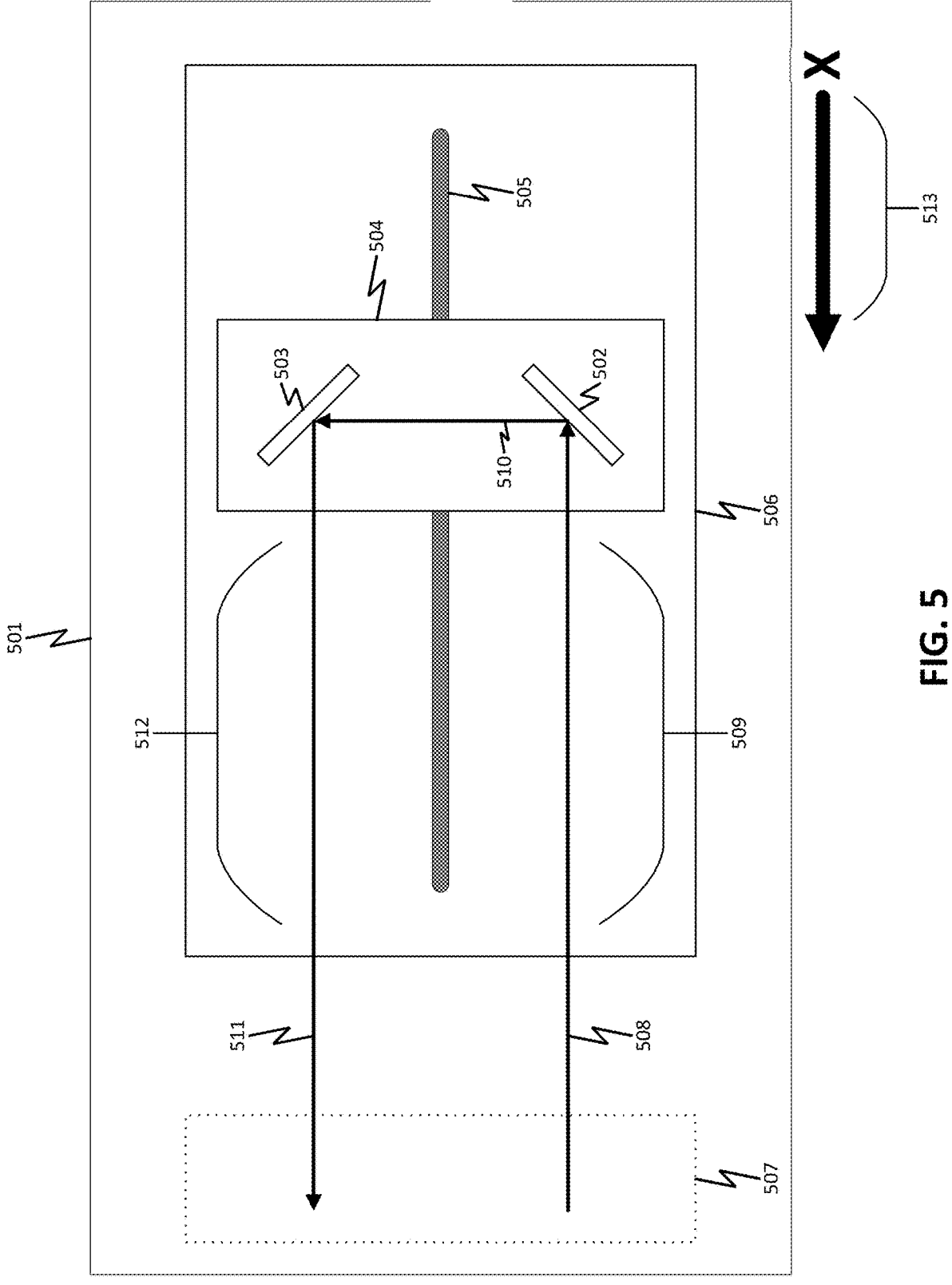
FIG. 5 is a block diagram of an optical delay line, according to some embodiments of the present disclosure.

In some embodiments, the pump-probe reflectometry system 101 may also comprise an optical delay line to increase the efficiency and ease of configuring and using the system 101. An optical delay line is a type of optical component that can be used to control the length of an optical path. FIG. 5 shows a block diagram of an optical delay line 501. As shown by the figure, the optical delay line 101 may comprise a pair of beam-reflecting components 502 and 503, such as mirrors, mounted on a platform 504. The pair of beam-reflecting components 502 and 503 are mounted such that a laser pulse approaching the optical delay line 501 along an optical sub-path 508 is reflected back along an adjacent and parallel optical sub-path 511. More precisely, a laser pulse (such as pump pulse 106) may travel along the optical sub-path 508 to the beam-reflecting component 502. The beam-reflecting component 502 reflects the laser pulse to the beam-reflecting component 503 along an optical sub-path 510. The beam-reflecting component 503 then reflects the laser pulse along an optical sub-path 511. The optical sub-paths 508, 511, and 512 may be part of a larger overall optical path 507 (such as the optical path 107 used by the pump pulse 106).

Additionally, the platform 504 is mounted on a railing 505 that is also parallel to the optical sub-paths 508 and 511. The platform 504 is movable in the x-direction 513, which is parallel to the optical sub-paths 508 and 511. This can increase or decrease a length 509 and a length 512 of the optical-sub paths 508 and 511, respectively. In turn, changes to the lengths 509 and 512 of the optical sub-paths 508 and 511 also change the length of the overall optical path 507. By using the optical delay line 501 to increase or decrease the length of the optical path 507, the length of time of time it takes a laser pulse to reach the end of the optical path 507 can be increased and decreased as may be desired. For example, if the optical delay line 501 is placed within the optical path 107, the length of time taken by the pump pulse 106 to reach the sample 110 can be adjusted. This can be used to control the probe time delay between the arrival of pump pulse 106 at the sample 110 and the arrival of the probe pulse 108. In some embodiments a motor may be used to move the platform 504 along the railing 505. Additionally, in some embodiments the controller 207 may be connected to and automatically control the position of the platform 504 in order to control the probe time delay between the arrival of pump pulse 106 at the sample 110 and the arrival of the probe pulse 108. As an example, depending on the tests being performed, it may be desirable to measure one or more samples at one delay time and then measure one or more samples at another delay time. For each sample, the controller 207 may be configured to adjust the optical delay line 501 as appropriate to achieve the desired probe time delay.

Figure 6:
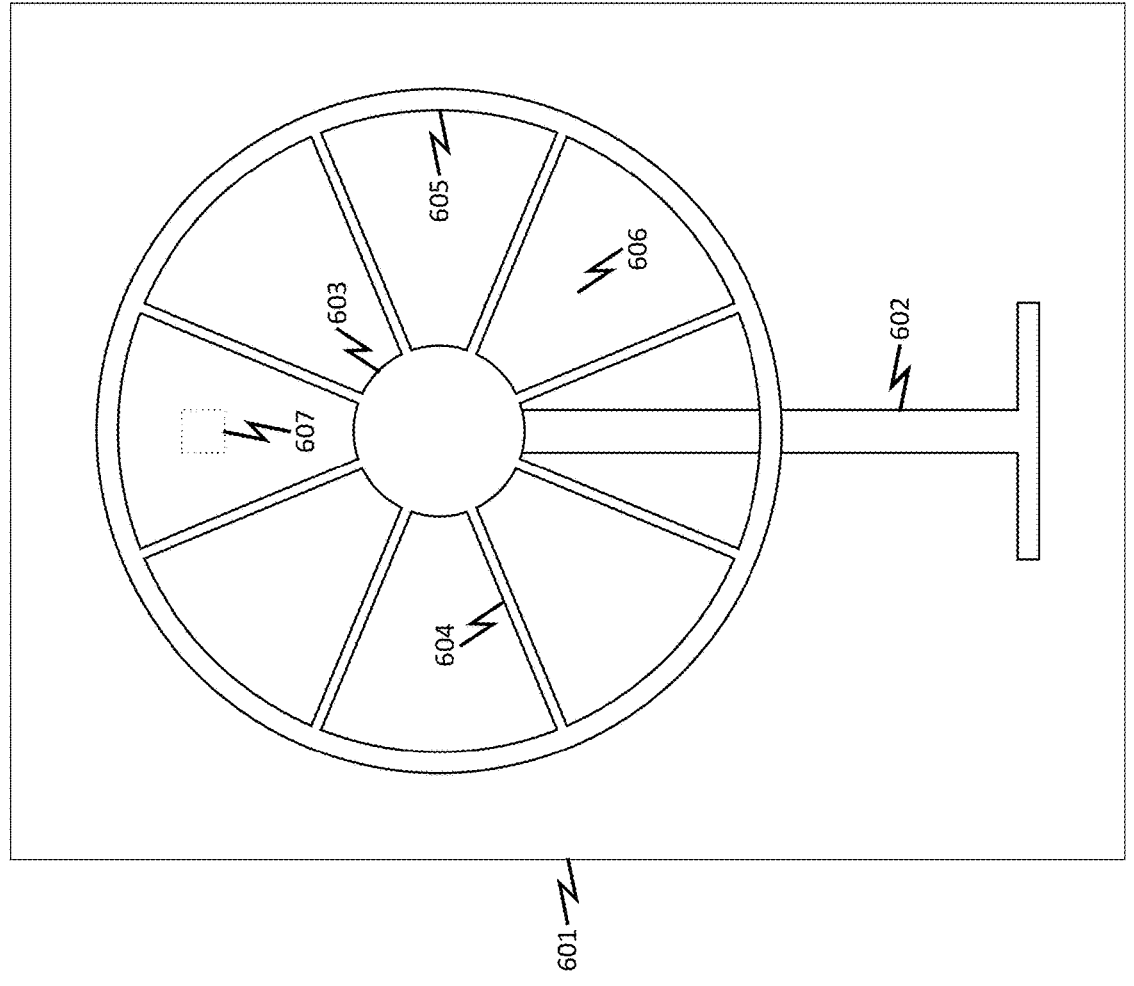
FIG. 6 is a block diagram of a chopper, according to some embodiments of the present disclosure.

In some embodiments, the pump-probe reflectometry system 101 may also comprise a chopper to increase the accuracy and sensitivity of the system 101. A chopper is a type of optical component that can be used to periodically block a laser pulse by physically occupying the optical path taken by that laser pulse. FIG. 6 shows a block diagram of a chopper 601. As shown by the figure, the chopper 601 may comprise a hub 603 connected to a rim 605 by a plurality of evenly spaced spokes 604. The hub 603 is also attached to and supported by a base 602. The chopper 601 is positioned within an optical path of a laser pulse such that the laser pulse passes through an area 607 between the hub 603 and the rim 605.

The hub 603 is connected to the base 602 such that the hub 603 can freely rotate in a plane containing the hub 603, the plurality of spokes 604, and the rim 605. By spinning the hub 603 (and thus also spinning the attached plurality of spokes 604 and rim 605), the plurality of spokes 604 can be brought into and out of the area 607. As a result, a laser pulse traveling along the optical path going through the chopper 601 is uninterrupted whenever the area 607 is occupied by the plurality of gaps 606 between the plurality of spokes 604 and is blocked whenever the area 607 is occupied by one of the plurality of spokes 604. In some embodiments a motor may be used to spin the hub 603. Additionally, in some embodiments the controller 207 may be connected to and automatically control the spinning (and angular frequency) of the hub 603. In other embodiments, other types and configurations of a chopper are possible.

Figure 7:
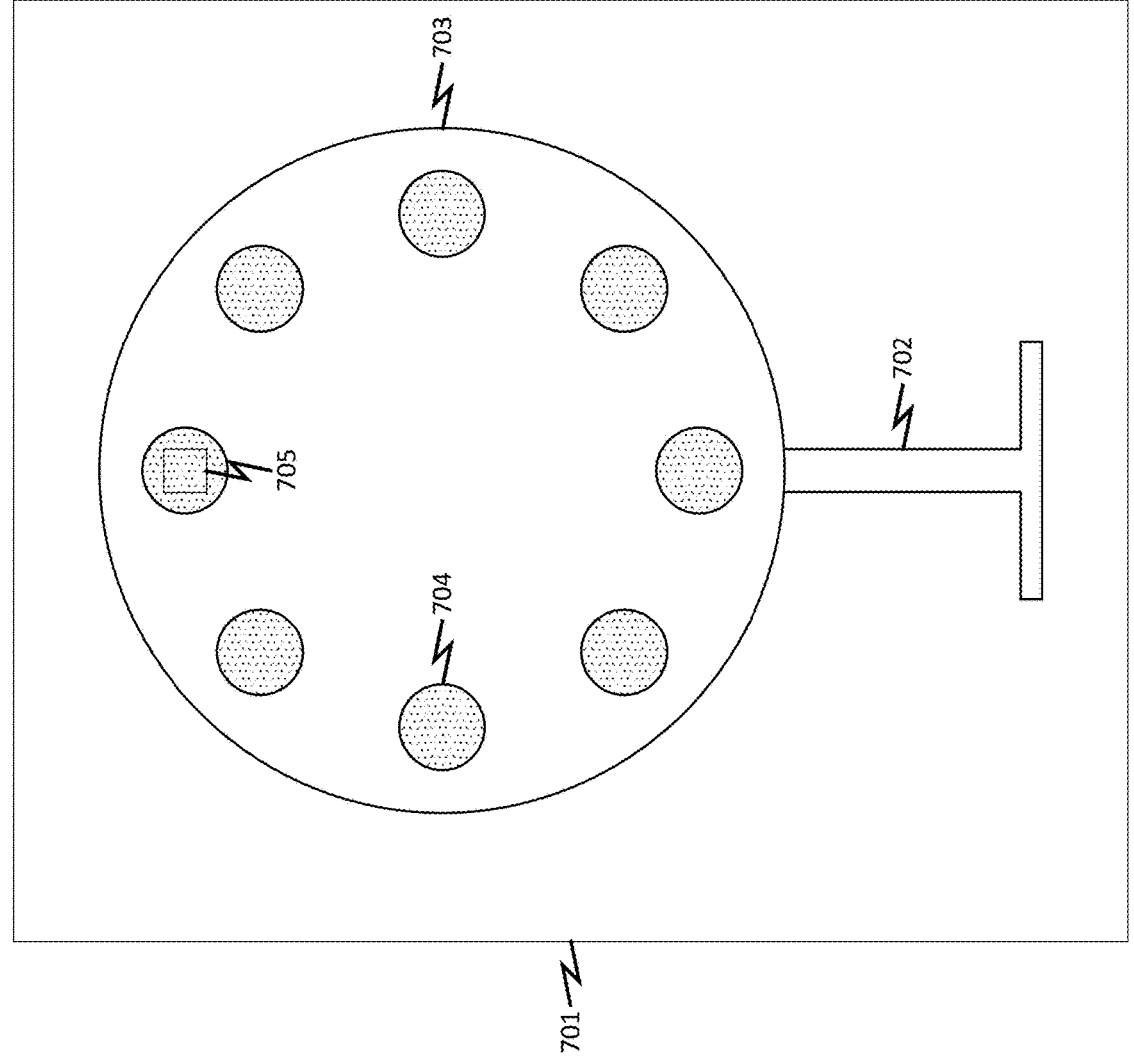
FIG. 7 is a block diagram of an optical bandpass filter, according to some embodiments of the present disclosure.

In some embodiments, the pump-probe reflectometry system 101 may also comprise an optical bandpass filter to enable the system 101 to determine the reflectivity of the sample 110 for specific spectral ranges. An optical bandpass filter is a type of optical component that can be used to filter a laser pulse traveling along an optical path so that only the portion of the laser pulse comprising light within a set spectral range (i.e., the passband) can pass through the optical bandpass filter. In other words, the optical bandpass filter transmits light whose wavelength is within a set passband and blocks light whose wavelength is outside the set passband. FIG. 7 shows a block diagram of an optical bandpass filter 701. As shown by the figure, the optical bandpass filter 701 may comprise a disk 703 that has a plurality of spectral filters 704 spaced evenly around the disk 703. The disk 703 is also attached to and supported by a base 702. The optical bandpass filter 701 is positioned within an optical path of a laser pulse such that the laser pulse passes through an area 705 through one of the plurality of spectral filters 704 and, more generally, through the region of the disk 703 occupied by the plurality of spectral filters 704.

The disk 703 is connected to the base 702 such that the disk 703 can freely rotate in a plane containing the disk 703 and the plurality of spectral filters 704. By spinning the disk 703 (and thus also spinning the plurality of spectral filters 704 within the disk 703) different spectral filters from the plurality of spectral filters 704 can be brought into the area 705. Each of these spectral filters has a different passband, i.e., allows a different spectral range to pass through. As a result, a laser pulse traveling along the optical path going through the optical bandpass filter 701 is filtered to contain only light within a certain range of wavelengths, with this range being determined by the particular spectral filter from the plurality of spectral filters 704 that is positioned within the area 705. In some embodiments a motor may be used to rotate the disk 603 to position different spectral filters within the area 705. Additionally, in some embodiments the controller 207 may be connected to and automatically control the rotation of the disk 603 in order to control which of the plurality of spectral filters 704 are positioned within the area 705. In other embodiments, other types of filters and other types of bandpass filters may be used to filter the light received by the photodetector as may be desired.

In some embodiments, the pump-probe reflectometry system 101 may also comprise an optical polarizer and a polarized filter to help increase the accuracy of the system 101. An optical polarizer is an optical component that can be used to change the polarization of light, including laser pulses. A polarized filter is a related optical component that can be used to filter light not having a certain polarization. In other words, a polarized filter has a certain type of polarization preference, such as linear or circular polarization. Light that has a different polarization or that is not correctly oriented with the polarized filter is blocked. These two components can be used in embodiments of the pump-probe reflectometry system 101 to block stray reflections from the pump pulse 106 from entering the photodetector 113 (and thus reducing the signal-to-noise ratio of the probe reflection pulse 111). More precisely, an optical polarizer can be positioned within the optical paths 107 or 109 and used to polarize either the pump pulse 106 or the probe pulse 108. By ensuring that the pump pulse 106 and the probe pulse 108 have different polarizations, a polarized filter can be used to allow light reflected from the probe pulse 108 to pass through while blocking light reflected from the pump pulse 106. In particular, a polarized filter matched to the polarization of the probe pulse 108 can be positioned within the optical path 112 (i.e., positioned between the sample 110 and the photodetector 113). This ensures that light reflected from the sample 110 pass through the filter and allow the probe reflection pulse 111 to pass through while blocking stray reflections generated by the pump pulse 106.

Figure 8:
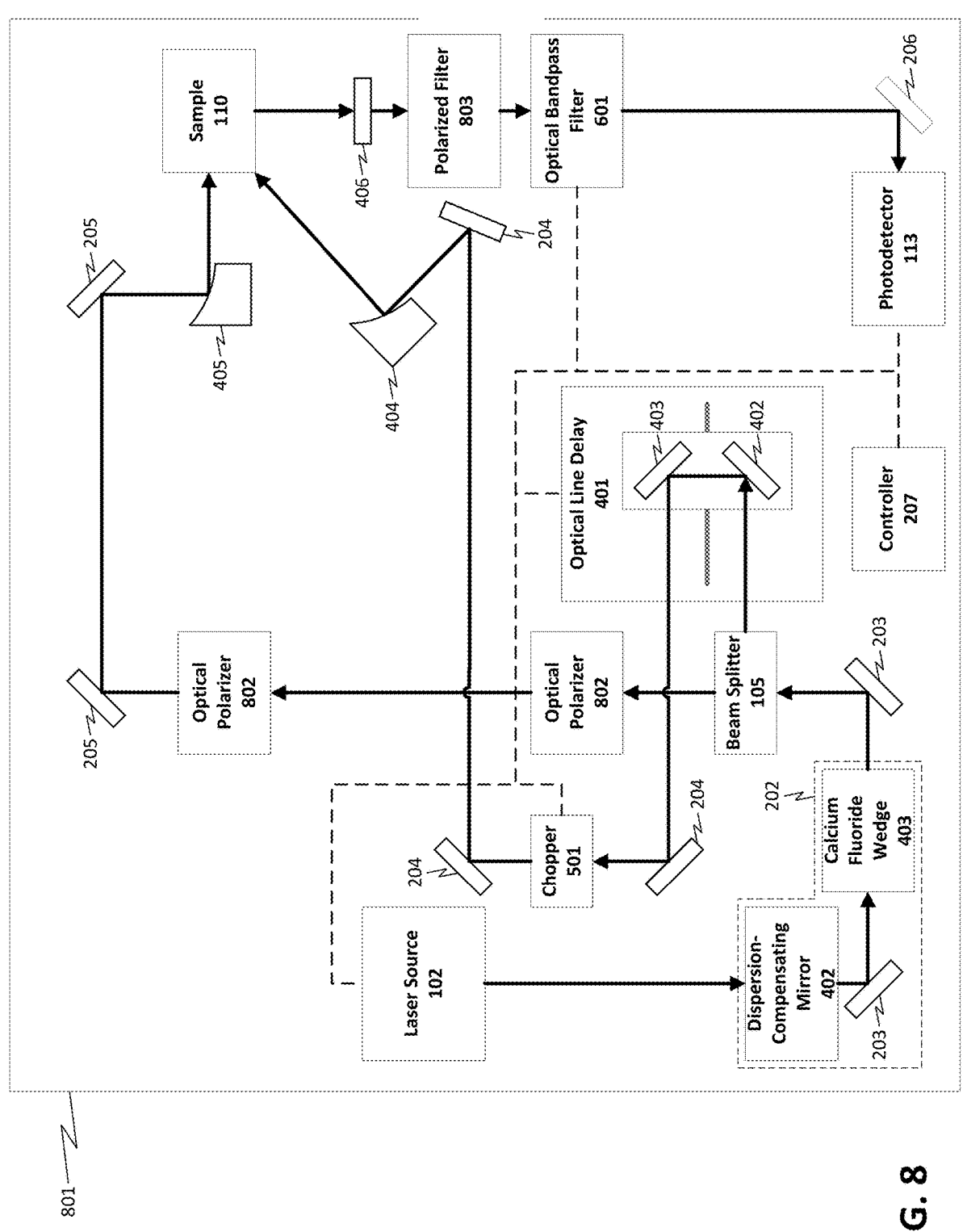
FIG. 8 is a block diagram of a third exemplary embodiment of a pump-probe reflectometry system, according to some embodiments of the present disclosure.
Figure 9A:
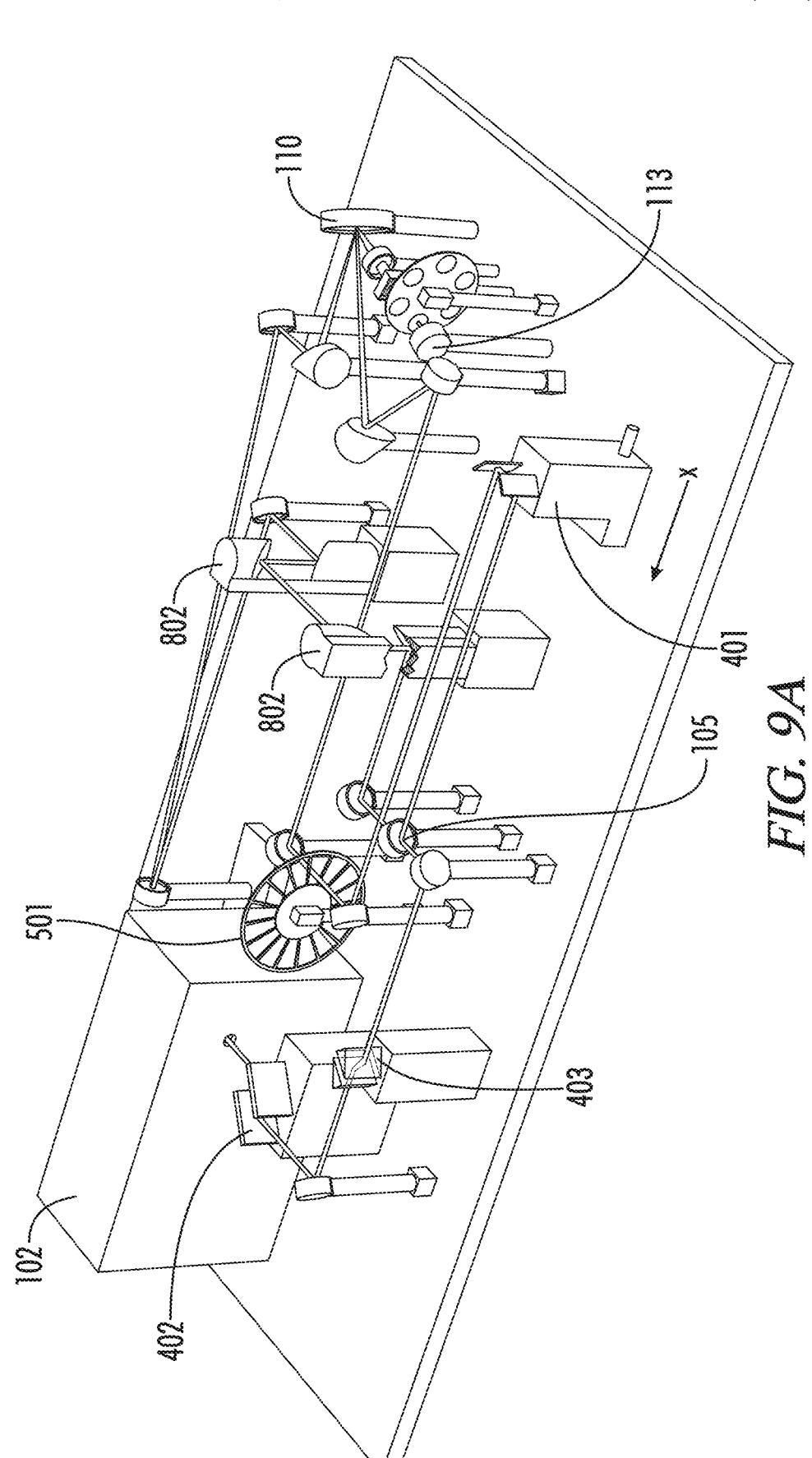
FIGS. 9A-9B are illustrations of the exemplary embodiment of the pump-probe reflectometry system shown in FIG. 8, according to some embodiments of the present disclosure.
Figure 9B:
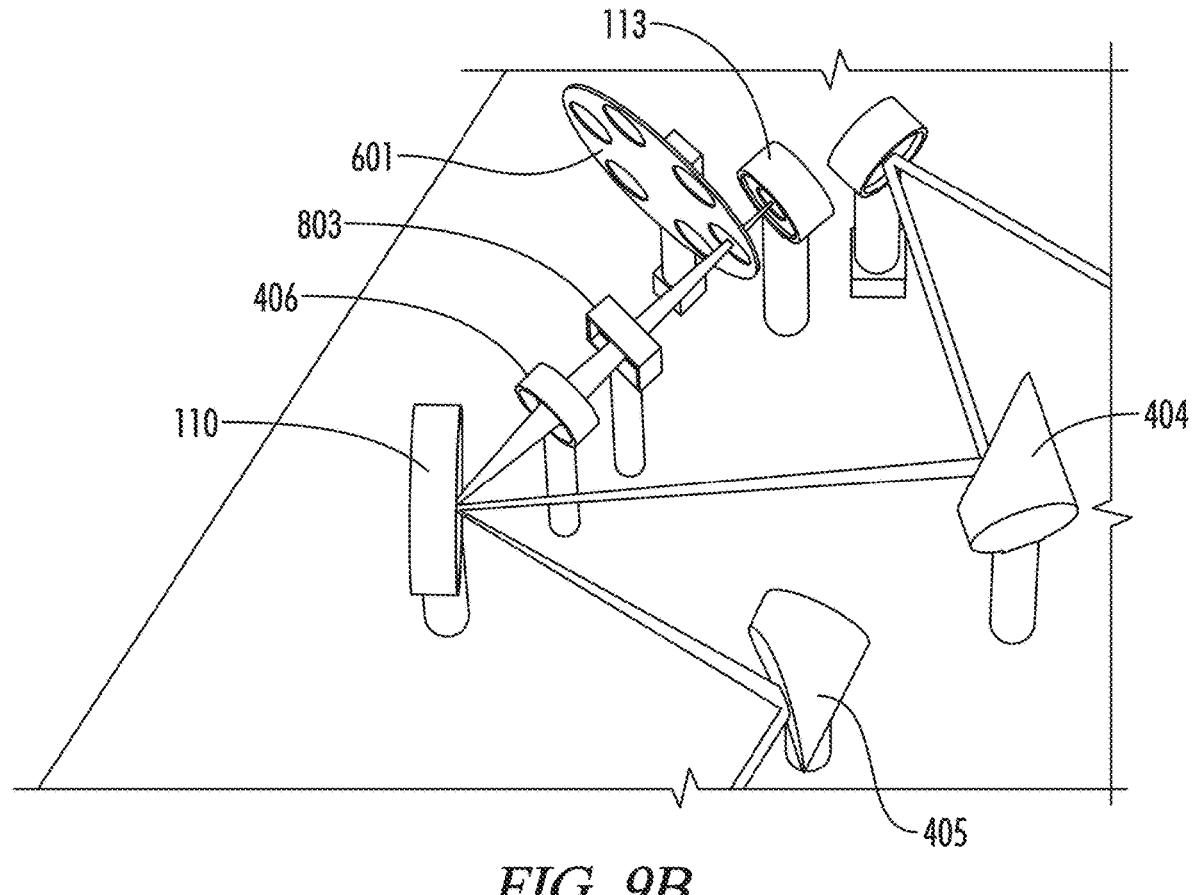

FIG. 8 is an example of a pump-probe reflectometry system 801 that is the same as the pump-probe reflectometry system 401 described above in FIG. 4 that also includes the optical line delay 501, the chopper 601, the optical bandpass filter 701, an optical polarizer 802, and a polarized filter 803 as just described above. FIGS. 9A-9B are a more detailed illustration of the pump-probe reflectometry system 801 shown in FIG. 8. The optical delay line 501 is positioned within the optical path 107. The optical delay line 501 is configured such that it can be used to alter the arrival time of the pump pulse 106 and thus to alter the probe time delay. The optical delay line 501 is also connected to the controller 207. The controller 207 may use this connection to send control signals that cause the optical delay line 501 to move and, consequently, to alter the probe time delay. The chopper 601 is also positioned within the optical path 107. The chopper 601 is configured to spin and periodically block the pump pulse 106 while allowing the probe pulse 108 to reach and reflect off of the unexcited sample 110. The chopper 601 is also connected to the controller 207. The controller 207 may use this connection to cause the chopper 601 to spin more slowly or more quickly.

The optical polarizer 802 is positioned within the optical path 109. More precisely, the optical polarizer 802 is a polarizing periscope configured to rotate the orientation of linearly polarized light by 90°. Since the pump pulse 106 and the probe pulse 108 initially share the same linear orientation, this results in the pump pulse 106 and the probe pulse 108 having different polarizations. Positioned within the optical path 112 is the polarized filter 803. The polarized filter 803 is configured to allow light with the same polar- ization as the probe pulse 108 (including the probe reflection pulse 111) to pass through unhindered while blocking light of a different polarization.

Also positioned within the optical path 107 is the optical bandpass filter 701. The optical bandpass filter 701 is configured to rotate and set different spectral filters. This results in only light with the spectral range allowed by the set spectral filter to pass through. The optical bandpass filter 701 is also connected to the controller 207.

The controller 207 is configured to automate the process of measuring the reflectivity of a specific sample by auto- matically taking multiple measurements of the sample 110 for different probe time delays and spectral ranges. More precisely, the controller 207 is configured to control the optical delay line 501 and the optical bandpass filter 701 to set different probe time delays and spectral ranges. By determining the reflectivity at different points of time after the sample 110 has been excited for different frequency ranges, one can obtain a view about the changes to the reflectivity for specific wavelengths as the sample transitions from the excited state back to the relaxed state. Since these reflectivity changes are caused by the evolution of various transient carrier dynamics, it can be used to evaluate the evolution of those transient carrier dynamics.

For example, FIGS. 11A-11D are a set of charts illustrat- ing a set of measurements of a reflection from a sample automatically taken at a variety of probe delay times and a variety of spectral ranges. As shown by the figures, the reflectivity of a reflection generated from a sample can be measured to determine the intensity of the reflection. In particular, the intensity of the reflection can be measured for specific probe time delays, such as at intervals of 10 pico- seconds, and for specific ranges of wavelengths, such as for 730 nm to 740 nm light. These measurements can be repeated, one for each combination of probe time delay and spectral range, to get a comprehensive overview of the changes in reflectivity of the sample 110 at various stages of the process of the sample 110 relaxing from its exited state (caused by the pump pulse) back to its ground state.

Figure 12A:
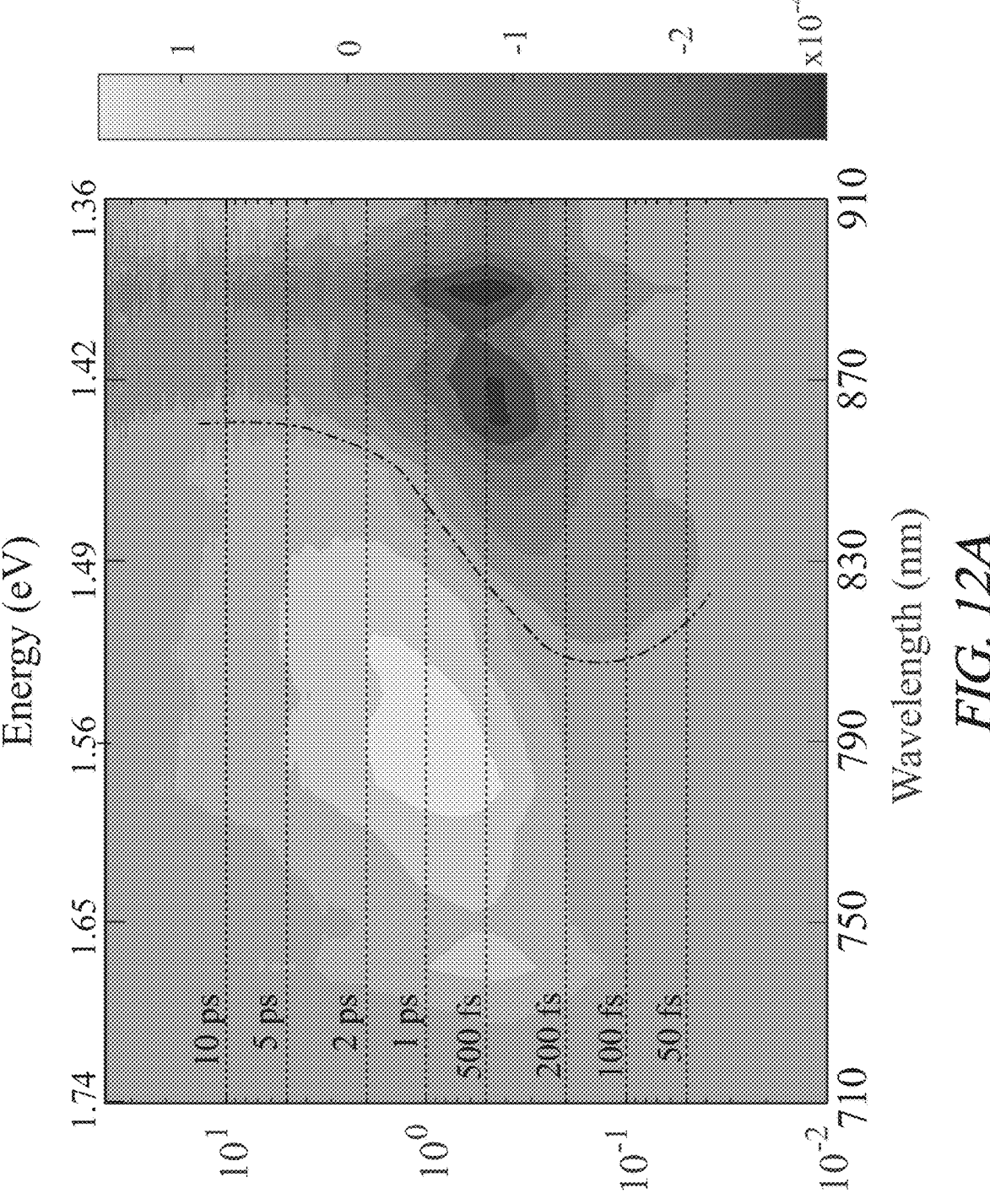
FIGS. 12A-12B are a second set of charts illustrating a set of measurements of a reflection from a sample automatically taken at a variety of probe delay times and a variety of spectral ranges, according to some embodiments of the present disclosure.
Figure 12B:
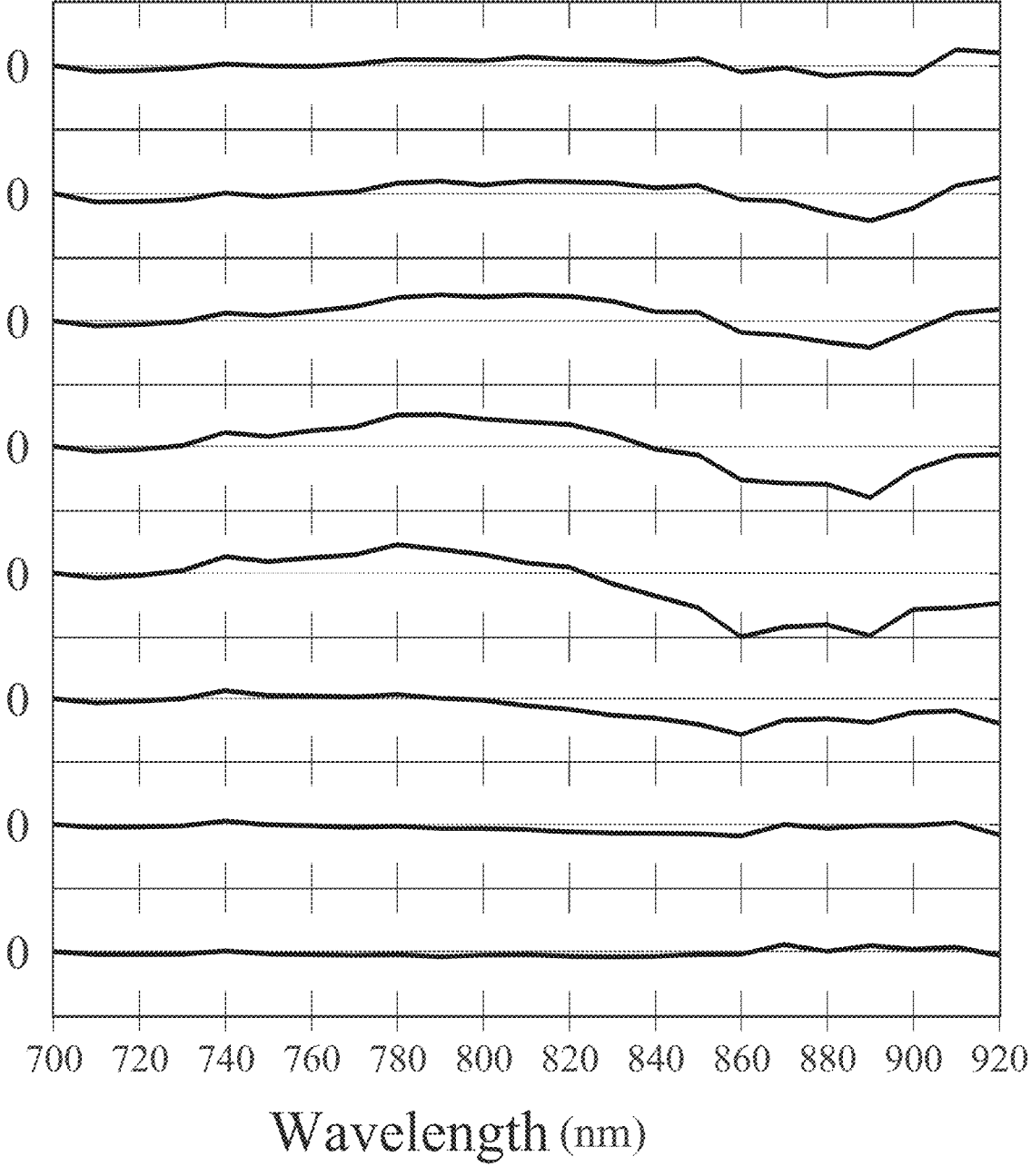

FIGS. 12A-12B are a second set of charts that similarly illustrate a set of measurements of a reflection taken across a range of probe delay times and spectral ranges. In par- ticular, as shown by the figures, the range of probe time delays can be explored across for variety of time scales (shown here as between about 10 femtoseconds to about 10 picoseconds). As suggested by the logarithmic nature of the graph shown in FIG. 12A, the interval between successive probe time delays may vary based on the time scale in question. For example, the interval for the probe time delay after 50 femtoseconds may be 10 femtoseconds whereas the interval after 500 femtoseconds may be 100 femtoseconds.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Now, therefore, the following is claimed:

1. A system for measuring surface reflectivity of a sample, comprising:

a laser source configured to transmit a laser pulse along a first optical path to a beam splitter configured to split the laser pulse into a pump pulse and a probe pulse;

a first plurality of beam-reflecting components configured to reflect the pump pulse from the beam splitter along a second optical path to the sample;

a second plurality of beam-reflecting components config- ured to reflect the probe pulse from the beam splitter along a third optical path to the sample, wherein a length of the third optical path is greater than a length of the second optical path such that the probe pulse arrives at the sample subsequent to the pump pulse while the sample is excited by the pump pulse;

a dispersion-compensating system positioned within the first optical path and configured to induce dispersion into the laser pulse to compensate for dispersion that is induced by the second optical path and the third optical path, wherein the dispersion-compensating system is configured such that the dispersion induced by the dispersion-compensating system (1) is of a type opposite to a type of the dispersion induced by the second optical path and the third optical path and (2) has a magnitude substantially similar to a magnitude of the dispersion induced by the second optical path and the third optical path such that the dispersion induced by the dispersion-compensating system substantially cancels the dispersion induced by the second optical path and the third optical path;

a photodetector configured to detect a reflection of the probe pulse from the sample transmitted along a fourth optical path; and a controller configured to determine a value indicative of a surface reflectivity of the sample based on the detected reflection of the probe pulse, wherein the dispersion-compensating system comprises:

a dispersion-compensating mirror positioned within the first optical path, the dispersion-compensating mirror configured to compensate for coarse-grained group-velocity dispersion induced by the second optical path and the third optical path; and a dispersion-compensating wedge positioned within the first optical path after the dispersion-compensating mirror, the dispersion-compensating wedge configured to compensate for fine-grained group-velocity dispersion induced by the second optical path and the third optical path.

2. The system of claim 1, wherein the beam splitter is configured to induce substantially similar group-velocity dispersion in the pump pulse and the probe pulse when splitting the laser pulse into the pump pulse and the probe pulse.

3. The system of claim 1, further comprising a third plurality of beam-reflecting components configured to reflect the laser pulse from the laser source along the first optical path to the dispersion-compensating system and to further reflect the laser pulse from the dispersion-compensating system along the first optical path to the beam splitter, wherein:

the first plurality of beam-reflecting components is configured to reflect the pump pulse using only metallic mirrors;

the second plurality of beam-reflecting components is configured to reflect the probe pulse using only metallic mirrors; and the third plurality of beam-reflecting components is configured to reflect the laser pulse using only metallic mirrors.

4. The system of claim 1, wherein:

at least one beam-reflecting component of the first plurality of beam-reflecting components is a first off-axis parabolic mirror configured to focus the pump pulse onto the sample; and at least one beam-reflecting component of the second plurality of beam-reflecting components is a second off-axis parabolic mirror configured to focus the probe pulse onto the sample.

5. The system of claim 1, further comprising:

a polarizer positioned within the third optical path, the polarizer configured to polarize the probe pulse into a polarization state orthogonal to a polarization state of the pump pulse; and a polarized filter positioned within the fourth optical path, the polarized filter configured to filter a reflection of the pump pulse by attenuating light being transmitted along the fourth optical path in a polarization state different from the polarization state of the probe pulse.

6. The system of claim 1, further comprising a bandpass filter positioned within the fourth optical path and configured to filter the reflection of the probe pulse from the sample based on a passband of frequencies, wherein the bandpass filter adjustable is configured to adjust the passband in response to a control signal.

7. The system of claim 1, further comprising an optical chopper positioned within the second optical path.

8. The system of claim 1, wherein:

at least one beam-reflecting component of the first plurality of beam-reflecting components or the second plurality of beam-reflecting components is movable in response to a control signal for changing the length of the second optical path or the length of the third optical path; and changing the length of the third optical path relative to the length of the second optical path causes a change in a time delay between the pump pulse arriving at the sample and the probe pulse arriving at the sample.

9. The system of claim 1, wherein the laser pulse has a duration less than 10 femtoseconds and has a spectral range of at least 200 nanometers.

10. The system of claim 1, further comprising an optical chopper positioned within the second optical path.

11. The system of claim 10, wherein:

at least one beam-reflecting component of the first plurality of beam-reflecting components is a first off-axis parabolic mirror configured to focus the pump pulse onto the sample; and at least one beam-reflecting component of the second plurality of beam-reflecting components is a second off-axis parabolic mirror configured to focus the probe pulse onto the sample.

12. The system of claim 11, further comprising:

a polarizer positioned within the third optical path, the polarizer configured to polarize the probe pulse into a polarization state orthogonal to a polarization state of the pump pulse; and a polarized filter positioned within the fourth optical path, the polarized filter configured to filter a reflection of the pump pulse by attenuating light being transmitted along the fourth optical path in a polarization state different from the polarization state of the probe pulse.

13. A method for measuring surface reflectivity of a sample, comprising:

transmitting a laser pulse along a first optical path;

splitting the laser pulse into a pump pulse and a probe pulse with a beam splitter positioned within the first optical path;

reflecting the pump pulse to direct the pump pulse to the sample along a second optical path;

reflecting the probe pulse to direct the probe pulse to the sample along a third optical path, wherein a length of the third optical path is greater than a length of the second optical path such that the probe pulse arrives at the sample subsequent to the pump pulse while the sample is excited by the pump pulse;

inducing first dispersion into the laser pulse to compensate for second dispersion that is induced by the second optical path and the third optical path, wherein the first dispersion (1) is of a type opposite to a type of the second dispersion and (2) has a magnitude substantially similar to a magnitude of the second dispersion such that the first dispersion substantially cancels the second dispersion, wherein the inducing the first dispersion into the laser pulse comprises: (1) using a dispersion-compensating mirror positioned within the first optical path to compensate for coarse-grained dispersion induced during by the second optical path and the third optical path, and (2) using a dispersion-compensating wedge positioned within the first optical path to compensate for fine-grained group-velocity dispersion induced by the second optical path and the third optical path;

detecting a reflection of the probe pulse from the sample transmitted along a fourth optical path; and determining a value indicative of a surface reflectivity of the sample based on the detected reflection of the probe pulse.

14. The method of claim 13, wherein the splitting the laser pulse into the pump pulse and the probe pulse induces substantially similar dispersion in the pump pulse and the probe pulse.

15. The method of claim 13, further comprising reflecting the laser pulse to direct the laser pulse along the first optical path, wherein:

the pump pulse is reflected using only metallic mirrors;

the probe pulse is reflected using only metallic mirrors; and the laser pulse is reflected using only metallic mirrors.

16. The method of claim 13, further comprising:

focusing the pump pulse onto the sample using an off-axis parabolic mirror; and focusing the probe pulse onto the sample using an off-axis parabolic mirror.

17. The method of claim 13, further comprising:

polarizing the probe pulse into a polarization state orthogonal to a polarization state of the pump pulse; and filtering a reflection of the pump pulse by attenuating light being transmitted along the fourth optical path in a polarization state different from the polarization state of the probe pulse.

18. The method of claim 13, further comprising:

receiving a control signal for setting a passband of frequencies; and filtering the reflection of the probe pulse from the sample by filtering the light transmitted along the fourth optical path based on the passband of frequencies set by the control signal.

19. The method of claim 13, further comprising periodically interrupting the transmission of the pump pulse to the sample by interrupting the transmission of the pump pulse along the second optical path.

20. The method of claim 13, further comprising changing the length of the second optical path or the length of the third optical path in response to a control signal.

21. The method of claim 13, wherein the laser pulse has a duration less than 10 femtoseconds and has a spectral range of at least 200 nanometers.

* * * * *